United States Patent
Seldess

(10) Patent No.: US 11,736,863 B2
(45) Date of Patent: *Aug. 22, 2023

(54) SUBBAND SPATIAL PROCESSING AND CROSSTALK CANCELLATION SYSTEM FOR CONFERENCING

(71) Applicant: Boomcloud 360, Inc., Encinitas, CA (US)

(72) Inventor: Zachary Seldess, San Diego, CA (US)

(73) Assignee: Boomcloud 360, Inc., Encinitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,801

(22) Filed: Nov. 12, 2021

(65) Prior Publication Data
US 2022/0070581 A1    Mar. 3, 2022

Related U.S. Application Data

(63) Continuation of application No. 16/856,373, filed on Apr. 23, 2020, now Pat. No. 11,252,508, which is a
(Continued)

(51) Int. Cl.
*H04R 3/12*    (2006.01)
*H04S 7/00*    (2006.01)
(Continued)

(52) U.S. Cl.
CPC .................. *H04R 3/12* (2013.01); *H04N 7/15* (2013.01); *H04N 7/152* (2013.01); *H04R 3/04* (2013.01);
(Continued)

(58) Field of Classification Search
CPC ... H04R 3/12; H04R 3/04; H04R 5/02; H04R 5/04; H04R 2420/01; H04N 7/15; H04N 7/152; H04S 7/307; H04S 5/00
See application file for complete search history.

(56) References Cited

U.S. PATENT DOCUMENTS

| 4,910,779 A | 3/1990 | Cooper et al. |
| 5,889,843 A | 3/1999 | Singer |

(Continued)

FOREIGN PATENT DOCUMENTS

| CN | 105264911 A | 1/2016 |
| CN | 105657633 A | 6/2016 |

(Continued)

OTHER PUBLICATIONS

China National Intellectual Property Administration, Office Action, CN Patent Application No. 201880079769.3, dated Nov. 30, 2020, 19 pages.

(Continued)

*Primary Examiner* — Jason R Kurr

(74) *Attorney, Agent, or Firm* — Fenwick & West LLP

(57) ABSTRACT

Embodiments relate to providing a conference for client devices with spatialized audio. Input audio streams are received from the client devices. For each client device, placement data defining spatial locations of other client devices within a sound field is determined. A mixed stream including a left mixed channel and a right mixed channel for the client device is generated by mixing and panning input audio streams of the other client devices according to the placement data. A spatially enhanced stream including a left enhanced channel for a left speaker and a right enhanced channel for a right speaker is generated by applying subband spatial processing and crosstalk processing on the left mixed channel and the right mixed channel of the mixed stream.

20 Claims, 13 Drawing Sheets

Related U.S. Application Data continuation of application No. 16/151,201, filed on Oct. 3, 2018, now Pat. No. 10,674,266.

(60) Provisional application No. 62/599,605, filed on Dec. 15, 2017.

(51) Int. Cl.
  *H04R 3/04* (2006.01)
  *H04R 5/02* (2006.01)
  *H04N 7/15* (2006.01)
  *H04R 5/04* (2006.01)

(52) U.S. Cl.
  CPC ............... *H04R 5/02* (2013.01); *H04R 5/04* (2013.01); *H04S 7/307* (2013.01); *H04R 2420/01* (2013.01)

(56) References Cited

U.S. PATENT DOCUMENTS

| | | | |
|---|---|---|---|
| 7,974,418 B1 | 7/2011 | Sakurai et al. | |
| 9,191,045 B2 | 11/2015 | Purnhagen et al. | |
| 2006/0008091 A1 | 1/2006 | Kim et al. | |
| 2008/0144794 A1* | 6/2008 | Gardner | H04M 3/568 379/202.01 |
| 2008/0260131 A1* | 10/2008 | Akesson | H04M 3/568 379/202.01 |
| 2009/0080632 A1 | 3/2009 | Zhang et al. | |
| 2010/0316232 A1 | 12/2010 | Acero et al. | |
| 2012/0076305 A1 | 3/2012 | Virolainen | |
| 2014/0016793 A1 | 1/2014 | Gardner | |
| 2014/0369519 A1 | 12/2014 | Leschka et al. | |
| 2015/0055770 A1 | 2/2015 | Spittle et al. | |
| 2017/0208411 A1 | 7/2017 | Seldess et al. | |
| 2017/0230777 A1 | 8/2017 | Seldess et al. | |

FOREIGN PATENT DOCUMENTS

| | | |
|---|---|---|
| CN | 105874821 A | 8/2016 |
| CN | 107113528 A | 8/2017 |
| JP | H02-59000 A | 2/1990 |
| JP | H10-304498 A | 11/1998 |
| JP | 2006-025439 A | 1/2006 |
| KR | 10-2014-0042900 A | 4/2014 |
| KR | 10-2016-0030911 A | 3/2016 |
| WO | WO 2013/142641 A1 | 9/2013 |
| WO | WO 2017/127286 A1 | 7/2017 |

OTHER PUBLICATIONS

European Patent Office, Extended European Search Report and Opinion, EP Patent Application No. 1889780.5, dated Aug. 3, 2021, eight pages.
Japan Patent Office, Office Action, JP Patent Application No. 2020-532786, dated Dec. 22, 2020, 11 pages.
PCT International Search Report and Written Opinion, PCT Application No. PCT/US2018/063153, dated Apr. 1, 2019, 14 pages.
United States Office Action, U.S. Appl. No. 16/151,201, dated Oct. 22, 2019, 24 pages.
United States Office Action, U.S. Appl. No. 16/151,201, dated Jun. 11, 2019, 22 pages.
United States Office Action, U.S. Appl. No. 16/856,373, dated May 5, 2021, 32 pages.

\* cited by examiner

SUBBAND SPATIAL PROCESSING AND CROSSTALK CANCELLATION SYSTEM FOR CONFERENCING

CROSS REFERENCE TO RELATED APPLICATIONS

This application is a continuation of U.S. patent application Ser. No. 16/856,373, filed Apr. 23, 2020, which is a continuation of U.S. patent application Ser. No. 16/151,201, filed Oct. 3, 2018, (now U.S. Pat. No. 10,674,266) which claims the benefit of U.S. Provisional Application No. 62/599,605, filed Dec. 15, 2017, all of which are incorporated by reference herein in their entirety for all purposes.

TECHNICAL FIELD

The subject matter described herein relates to audio processing, and more particularly to spatialized audio processing for conferencing client devices.

BACKGROUND

Electronic devices are used to provide remote conferencing between multiple users. Typically, an audio stream of a user is generated to capture speech by the user, while audio streams of other users are combined to provide sound for listening by the user. For example, the combined stream may be a monophonic stream for a speaker. For stereo speakers, the monophonic stream is reproduced for left and right speakers. Unlike an in-person meeting, there is no spatial sense of the sound field for different participants in the monophonic stream, and thus voice differentiation and intelligibility is reduced.

SUMMARY

Embodiments relate to providing a conference for client devices with spatialized audio. In some embodiments, input audio streams are received from client devices. For a client device, placement data defining spatial locations for other client devices within a sound field are determined. A mixed stream including a left mixed channel and a right mixed channel for the client device is generated by mixing and panning input audio streams of the other client devices according to the placement data. A spatially enhanced stream including a left enhanced channel and a right enhanced channel is generated by applying subband spatial processing and crosstalk processing on the left mixed channel and the right mixed channel of the mixed stream. The spatially enhanced stream is provided to the client device.

In some embodiments, a non-transitory computer readable medium storing instructions that when executed by a processor configures the processor to: receive input audio streams from the client devices; determine, for a client device, placement data defining spatial locations for other client devices within a sound field; and generate a mixed stream for the client device including a left mixed channel and a right mixed channel by mixing and panning input audio streams of the other client devices according to the placement data.

In some embodiments, a system provides a conference for client devices. The system includes processing circuitry configured to: receive input audio streams from the client devices; determine, for a client device, placement data defining spatial locations for other client devices within a sound field; and generate a mixed stream for the client device including a left mixed channel and a right mixed channel by mixing and panning input audio streams of the other client devices according to the placement data.

Other aspects include components, devices, systems, improvements, methods, processes, applications, computer readable mediums, and other technologies related to any of the above.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to providing a conference for client devices with spatialized audio output for each client device. For example, an audio processing system delivers the spatialized audio for each client device, adaptively optimizing to the rendering device type of each client device using a combination of real-time spatial mixing and spatial enhancement. To generate an output stream for a client device, audio streams from other client devices are each associated with a spatial location within a sound field of the client device. The audio streams are mixed and panned according to the spatial locations to generate a mixed stream with spatialized audio. Next, the spatial enhancement is applied to the spatialized audio mixed stream to enhance the spatial sense of the sound field. The spatial enhancement may include subband spatial processing and crosstalk processing. The crosstalk processing may include crosstalk cancellation (e.g., for loudspeakers) or crosstalk simulation (e.g., for headphones). Among other things, the spatial sense in the sound field for different remote participant voices improves the differentiation and intelligibility of remote conference voices.

In some embodiments, a conferencing pipeline includes a server (or "bridge") and two or more client devices. The client devices may include varying sound-rendering hardware. The server provides device-optimized enhanced spatial audio for different types of hardware.

In some embodiments, one or more channels of incoming audio streams are mixed down to a stereo audio stream. Device-specific spatial audio enhancement is then adaptively applied, based on the rendering system (e.g., built-in laptop speakers, Bluetooth speakers, headphones, etc.) of each client device. In some embodiments, each client device receives the mixed stream from the server, and applies a suitable spatial enhancement. In some embodiments, a client device may provide parameters for the spatial enhancement to the server, and the server performs the spatial enhancement to generate a spatially enhanced stream for the client device. In some embodiments, a client device may receive one or more client audio streams and apply both the mixdown followed by suitable spatial enhancement to the mixed stereo stream.

Example Audio Processing System

Figure 1:
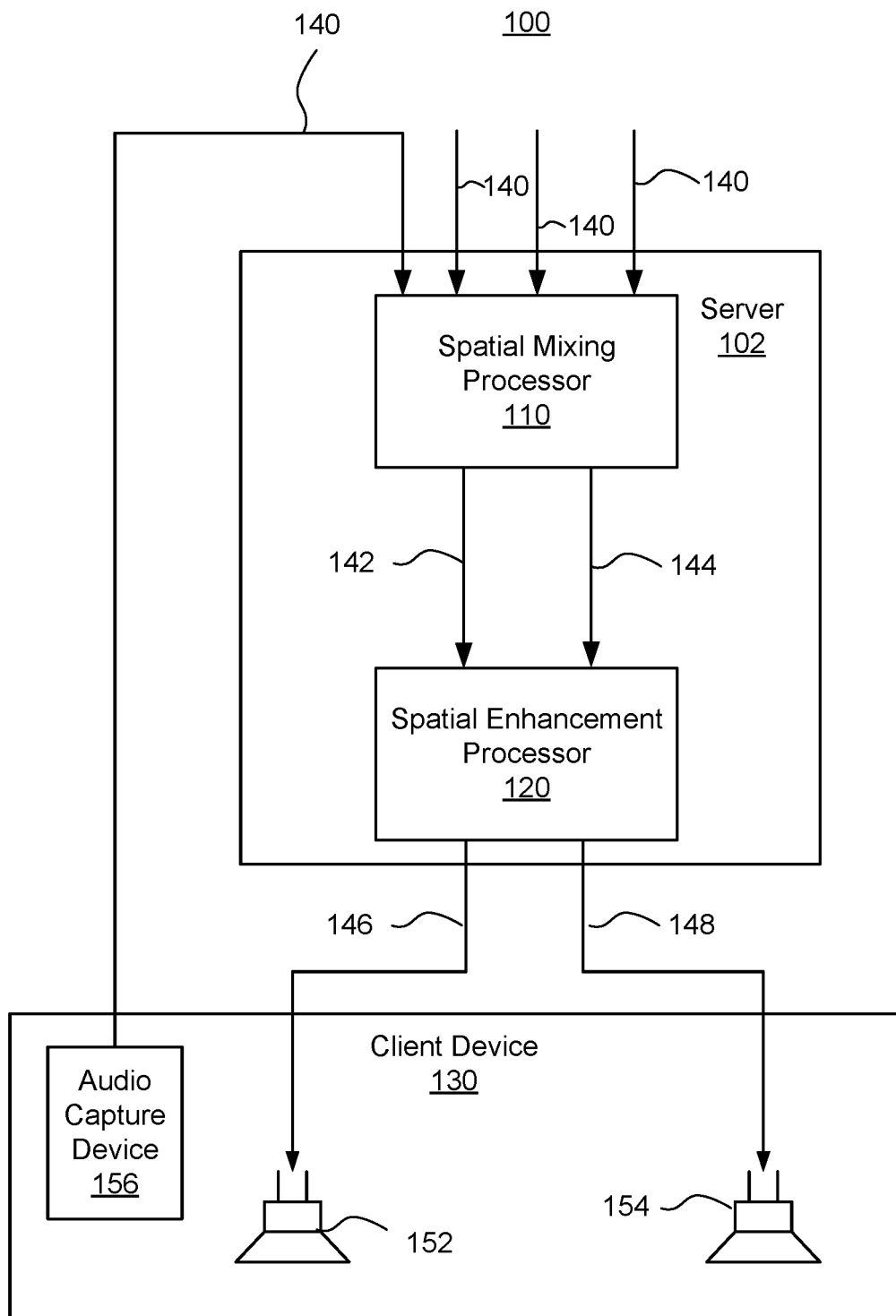
FIG. 1 is a schematic block diagram of an audio processing system, in accordance with some embodiments.

FIG. 1 is a block diagram of an audio processing system 100, in accordance with some embodiments. The audio processing system 100 includes a server 102 and a client device 130. Although a single client device 130 is shown, the server 102 provides for conferencing between multiple client devices 130. The server 102 may be connected to the client devices via a network, including the Internet. Each client device 130 may include an audio capture device 156 (e.g., a microphone) and a left speaker 152 and a right speaker 154. The speakers 152, 154 may be loudspeakers or headphones.

The server 102 includes a spatial mixing processor 110 and a spatial enhancement processor 120. To facilitate a conference between multiple client devices 130, the spatial mixing processor 110 receives multiple input audio streams 140, each from a client device 130, and applies panning and mixdown of the input audio streams 140 into a stereo audio stream. The stereo audio stream includes a left mixed channel 142 and a right mixed channel 144. Each of the input audio streams 140 may be an audio stream with one or more channels, generated by the audio capture device 156 of a client device 130. In some embodiments, an audio stream 140 may include a monophonic audio stream.

Each participant of a conference is associated with a client device 130. Each client device 130 may generate an audio stream 140 that is sent to the spatial mixing processor 110. In connection with the audio stream 140, each client device 130 may provide various types of metadata including device identification data or placement data to the spatial mixing processor 110. The device identification data is a unique identifier that identifies the client device 130. The placement data defines the spatial locations of other audio streams 140 of other client devices 130 for the client device 130. The spatial mixing processor 110 generates a unique stereo audio stream for each client device 130 in which the audio signals 140 from other client devices 130 are distributed (e.g., panned) across a stereo sound field according to the placement data.

In some embodiments, the panning for the audio streams 140 may be based on a predefined placement data defining a spatial distribution of the audio streams 140. Placement techniques may include equal spatial distribution of remote client devices 130, or grouping and panning of sources based on participant metadata (e.g., user role, entity/company name, group membership, room location, geographic location, IP address, etc.). In some embodiments, the panning for each client device 130 may be based on control from the client device 130. For example, a user of a client device 130 may define placement data specifying a desired pan position for each remote participant.

The spatial mixing processor 110 generates a unique stereo audio stream including the left mixed channel 142 and right mixed channel 144 for each client device 130. Whether the placement data defining the spatial distribution of the audio signals 140 are programmatically defined or user defined, the audio signals 140 of other client devices 130 are panned into a stereo mixdown. The panning may include panning techniques such as amplitude panning, delay panning, binaural panning, etc. to generate the stereo stream for the client device 130. In some embodiments, panning can include applying gains to adjust the presence of each element in the final mix. Other perceptually motivated cues may also be applied, such as air absorption simulation for distance cues, or room acoustics simulation.

In some embodiments, the output of the spatial mixing processor 110 for a client device 130 may include a monophonic reduction to a single channel, such as when a client device 130 or listening context uses a one-channel reproduction.

The spatial enhancement processor 120 applies a spatial processing to the left mixed channel 142 and the right mixed channel 144 to generate a left enhanced channel 146 and a right enhanced channel 148. The spatial enhancement processing may include a subband spatial processing and crosstalk processing. The crosstalk processing may include crosstalk cancellation or crosstalk simulation. Crosstalk cancellation may be used when the speakers 152, 154 of a client device 130 are loudspeakers to remove crosstalk caused by the loudspeakers. Crosstalk simulation may be used when the speakers 152, 154 are headphones to simulate the effect of loudspeakers. When there is crosstalk processing applied to the left mixed channel 142 and the right mixed channel 144, the spatial enhancement processing may further include a crosstalk compensation that corrects for spectral defects caused by application of the crosstalk processing. The spatial enhancement processor 120 provides the left enhanced channel 146 to the left speaker 152 of the client device 130, and the right enhanced channel 148 to the right speaker 154 of the client device 130. The speakers 152, 154 convert the respective output channels $O_L$ and $O_R$ into sound.

In some embodiments, the spatial enhancement processor 120 is located at the server 102. The server 102 may execute a separate instance of spatial enhancement processing for each client device 130. In other embodiments, the spatial enhancement processor 120 is located at each client device 130. For each client device 130, the server 102 provides a mixed stream including the left mixed channel 142 and right mixed channel 144 to the spatial enhancement processor 120 of the client device 130. The spatial enhancement processor 120 of each client device 130 processes the mixed channel received from the server 102 to generate the left output channel 146 and right output channel 148. In some embodiments, the spatial mixing processor 110 is also located in a client device 130, such as in a peer-to-peer conferencing configuration of the system 100, or when the server does not perform the mixdown.

The system 100 may include fewer or additional components. For example, the conferencing using audio streams may be integrated with video streams. In some embodiments, the system 100 is an artificial reality system, where each client device 130 may include a head-mounted display. The head-mounted display may render other users or avatars of the users in a video, where users are positioned to correspond with the spatial locations of the client devices 130 in the mixed stream within the sound field. The immersive quality of the artificial reality environment is thus improved.

Example Spatial Mixing Processor

Figure 2:
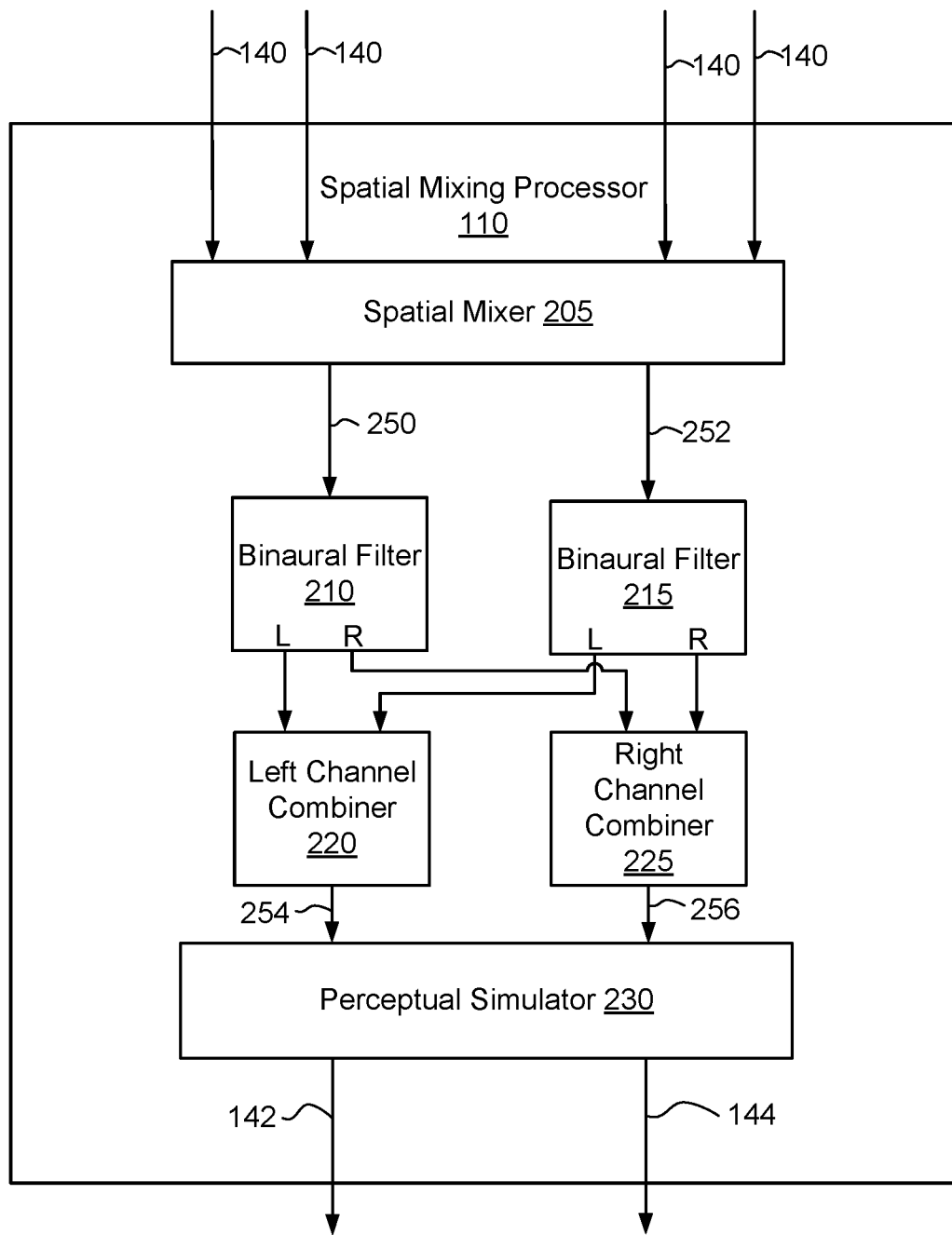
FIG. 2 is a schematic block diagram of a spatial mixing processor, in accordance with some embodiments.

FIG. 2 is a schematic block diagram of a spatial mixing processor 110, in accordance with some embodiments. The spatial mixing processor 110 includes a spatial mixer 205, a binaural filters 210 and 215, a left channel combiner 220, a right channel combiner 225, and a perceptual simulator 230. The spatial mixer 205 applies control over how energy within the incoming audio stream is distributed over the final stereo mixdown, and relatedly how elements within the final mix are perceived within the context of the soundstage. For example, spatial mixing of a mono audio stream may be achieved using constant-power or linear stereo panning techniques. In some embodiments, the spatial mixer 205 applies the spatial mixing to each audio signal 140 to generate a left and right channel, combines the left channels to generate a left channel 250, and combines the right channels to generate a right channel 252.

The audio stream may also be processed in such a way as to perceptually position the sound in 3D space around the listener's head, as can be achieved via binaural filtering. Each of the binaural filters 210 and 215 apply a head-related transfer function (HRTF) that describes the target source location from which the listener should perceive the sound of the input channel. The binaural filter 210 receives the left channel 220 and generates a left and right output channel by applying an HRTF that adjusts for an angular position associated with the left channel 250. The binaural filter 215 receives the right channel 252 and generates a left and right output channel by applying an HRTF that adjusts for an angular position associated with the right channel 252. The left channel combiner 220 receives the left channels from the binaural filters 210 and 215, and combines these channels to generate a left channel 254. The right channel combiner 225 receives the right channels from the binaural filters 210 and 215, and combines these channels to generate a right channel 256.

Processing may also be applied to simulate other real-world perceptual cues. The perceptual simulator 230 receives the left channel 254 and the right channel 256, and applies perceptual queues to one or more of the channels to generate the left mixed channel 142 and the right mixed channel 144. A channel may be scaled and filtered to provide the perception of variable distance and air absorption within the mix, for example, using the free-field inverse distance law, wherein sound pressure level decreases by 6 decibels per doubling of distance relative to a reference distance (e.g., a defined distance from the virtual location of the listener). Air absorption may be simulated where high frequency energy is attenuated in inverse proportion to an increase in distance relative to a reference distance. Reverb may be used to further enhance the perception of distance and to create a sense of room acoustics and environmental context.

In some embodiments, an audio signal 140 includes multiple (e.g., left and right) channels. The spatial mixer 205 applies a mixdown by combining the channels of the audio signal into a monophonic channel, and applies constant-power or linear stereo panning to the monophonic channel. In another example, there is no combination into a monophonic signal, and the mixdown is applied using each channel of the audio signal 140. For example, the spatial mixer 205 may apply different binaural filtering to each channel based on it's ideal position in space around the listener, and mix the results down to stereo left and right channels.

The spatial mixing processor 110 may include fewer or additional components. For example, the perceptual simulator 230 or binaural filters 210 and 215 may be omitted. The spatial mixing processor 110 may perform various types of mixdowns of the audio signals 140 including amplitude panning, delay panning, binaural panning, etc.

Example Spatial Enhancement Processor

Figure 3:
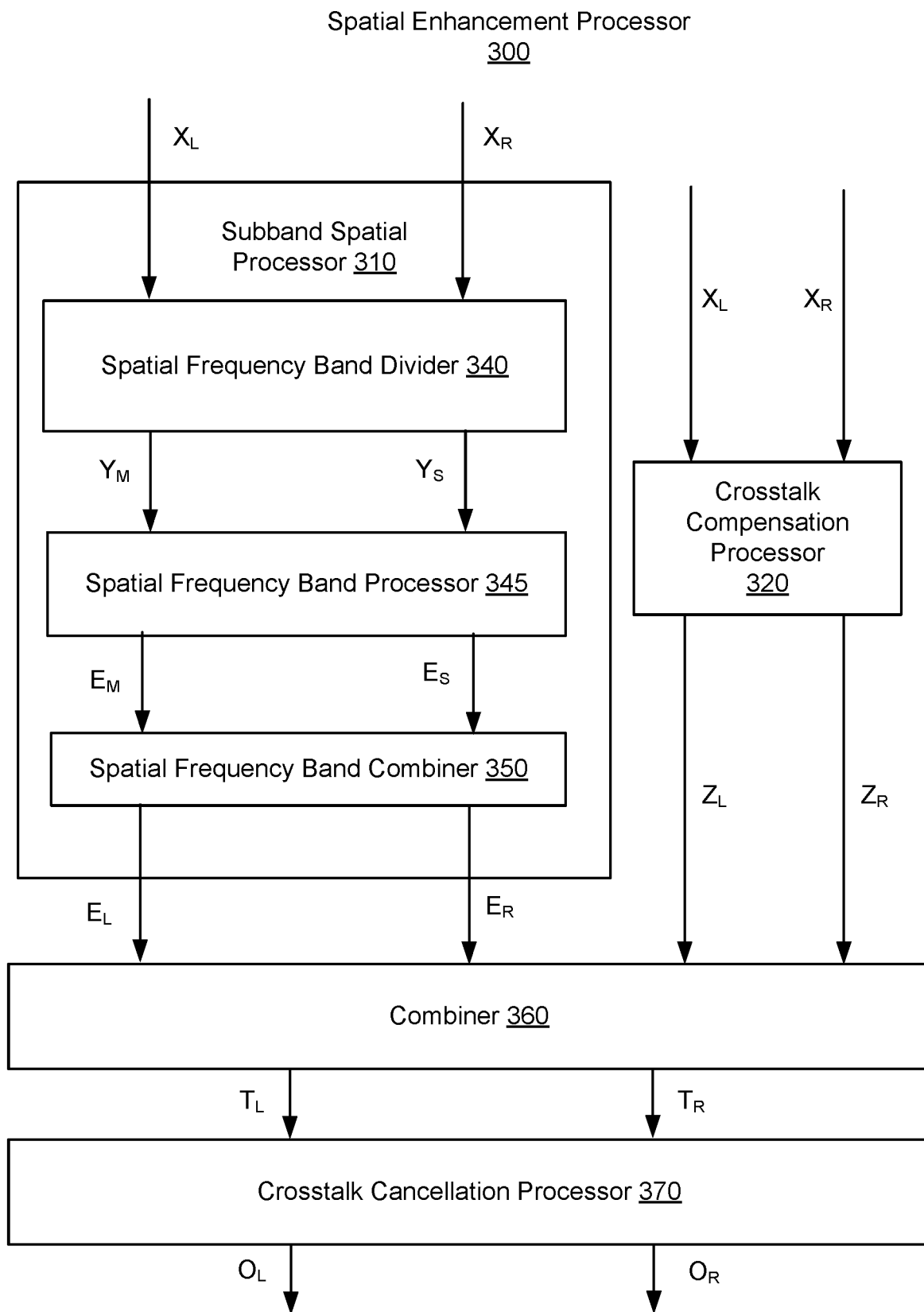
FIG. 3 is a schematic block diagram of a spatial enhancement processor with crosstalk cancellation, in accordance with some embodiments.

FIG. 3 is a schematic block diagram of a spatial enhancement processor 300, according to one embodiment. The spatial enhancement processor 300 is an example of a spatial enhancement processor 120 where the crosstalk processing is a crosstalk cancellation for a client device 130 where the speakers 152, 154 are loudspeakers. The spatial enhancement processor 300 receives an input audio signal X including a left input channel $X_L$ and a right input channel $X_R$. The left input channel $X_L$ may be the left output channel 142 from the spatial mixing processor 110, and the right input channel $X_R$ may be the right output channel 144 from the spatial mixing processor 110.

The spatial enhancement processor 300 generates an output audio signal O including a left enhanced channel $O_L$ and a right enhanced channel $O_R$ by processing the input channels $X_L$ and $X_R$. The left enhanced channel $O_L$ corresponds with the left enhanced channel 146 and the right enhanced channel $O_R$ corresponds with the right enhanced channel 148. The audio output signal O is a spatially enhanced audio signal of the input audio signal X with crosstalk compensation and crosstalk cancellation.

The spatial enhancement processor 300 includes a subband spatial processor 310, a crosstalk compensation processor 320, a combiner 360, and a crosstalk cancellation processor 370. The spatial enhancement processor 300 performs crosstalk compensation and subband spatial processing of the input audio input channels $X_L$, $X_R$, combines the result of the subband spatial processing with the result of the crosstalk compensation, and then performs a crosstalk cancellation on the combined signals.

The subband spatial processor 310 includes a spatial frequency band divider 340, a spatial frequency band processor 345, and a spatial frequency band combiner 350. The spatial frequency band divider 340 is coupled to the input channels $X_L$ and $X_R$ and the spatial frequency band processor 345. The spatial frequency band divider 340 receives the left input channel $X_L$ and the right input channel $X_R$, and processes the input channels into a spatial (or "side") component $Y_s$ and a nonspatial (or "mid") component $Y_m$. For example, the spatial component $Y_s$ can be generated based on a difference between the left input channel $X_L$ and the right input channel $X_R$. The nonspatial component $Y_m$ can be generated based on a sum of the left input channel $X_L$ and the right input channel $X_R$. The spatial frequency band divider 340 provides the spatial component $Y_s$ and the nonspatial component $Y_m$ to the spatial frequency band processor 345.

The spatial frequency band processor 345 is coupled to the spatial frequency band divider 340 and the spatial frequency band combiner 350. The spatial frequency band processor 345 receives the spatial component $Y_s$ and the nonspatial component $Y_m$ from spatial frequency band divider 340, and enhances the received signals. In particular, the spatial frequency band processor 345 generates an enhanced spatial component $E_s$ from the spatial component $Y_s$, and an enhanced nonspatial component $E_m$ from the nonspatial component $Y_m$.

For example, the spatial frequency band processor 345 applies subband gains to the spatial component $Y_s$ to generate the enhanced spatial component $E_s$, and applies subband gains to the nonspatial component $Y_m$ to generate the enhanced nonspatial component $E_m$. In some embodiments, the spatial frequency band processor 345 additionally or alternatively provides subband delays to the spatial component $Y_s$ to generate the enhanced spatial component $E_s$, and subband delays to the nonspatial component $Y_m$ to generate the enhanced nonspatial component $E_m$. The subband gains and/or delays may can be different for the different (e.g., n) subbands of the spatial component $Y_s$ and the nonspatial component $Y_m$, or can be the same (e.g., for two or more subbands). The spatial frequency band processor 345 adjusts the gain and/or delays for different subbands of the spatial component $Y_s$ and the nonspatial component $Y_m$ with respect to each other to generate the enhanced spatial component $E_s$ and the enhanced nonspatial component $E_m$. The spatial frequency band processor 345 then provides the enhanced spatial component $E_s$ and the enhanced nonspatial component $E_m$ to the spatial frequency band combiner 350.

The spatial frequency band combiner 350 is coupled to the spatial frequency band processor 345, and further coupled to the combiner 360. The spatial frequency band combiner 350 receives the enhanced spatial component $E_s$ and the enhanced nonspatial component $E_m$ from the spatial frequency band processor 345, and combines the enhanced spatial component $E_s$ and the enhanced nonspatial component $E_m$ into a left spatially enhanced channel $E_L$ and a right spatially enhanced channel $E_R$. For example, the left spatially enhanced channel $E_L$ can be generated based on a sum of the enhanced spatial component $E_s$ and the enhanced nonspatial component $E_m$, and the right spatially enhanced channel $E_R$ can be generated based on a difference between the enhanced nonspatial component $E_m$ and the enhanced spatial component $E_s$. The spatial frequency band combiner 350 provides the left spatially enhanced channel $E_L$ and the right spatially enhanced channel $E_R$ to the combiner 360. Additional details regarding the subband spatial processor 310 are discussed below in connection with FIG. 4.

The crosstalk compensation processor 320 performs a crosstalk compensation to compensate for spectral defects or artifacts in the crosstalk cancellation. The crosstalk compensation processor 320 receives the input channels $X_L$ and $X_R$, and performs a processing to compensate for any artifacts in a subsequent crosstalk cancellation of the enhanced nonspatial component $E_m$ and/or the enhanced spatial component E performed by the crosstalk cancellation processor 370. In some embodiments, the crosstalk compensation processor 320 may perform an enhancement on the nonspatial component $X_m$ and the spatial component $X_s$ by applying filters to generate a crosstalk compensation signal Z, including a left crosstalk compensation channel $Z_L$ and a right crosstalk compensation channel $Z_R$. In other embodiments, the crosstalk compensation processor 320 may perform an enhancement on only the nonspatial component $X_m$. Additional details regarding the crosstalk compensation processor 320 are discussed below in connection with FIG. 4.

The combiner 360 combines the left spatially enhanced channel $E_L$ with the left crosstalk compensation channel $Z_L$ to generate a left enhanced compensated channel $T_L$, and combines the right spatially enhanced channel $E_R$ with the right crosstalk compensation channel $Z_R$ to generate a right compensation channel $T_R$. The combiner 360 is coupled to the crosstalk cancellation processor 370, and provides the left enhanced compensated channel $T_L$ and the right enhanced compensation channel $T_R$ to the crosstalk cancellation processor 370.

The crosstalk cancellation processor 370 receives the left enhanced compensated channel $T_L$ and the right enhanced compensation channel $T_R$, and performs crosstalk cancellation on the channels $T_L$, $T_R$ to generate the output audio signal O including left output channel $O_L$ and right output channel $O_R$. Additional details regarding the crosstalk cancellation processor 370 are discussed below in connection with FIG. 5.

Figure 4:
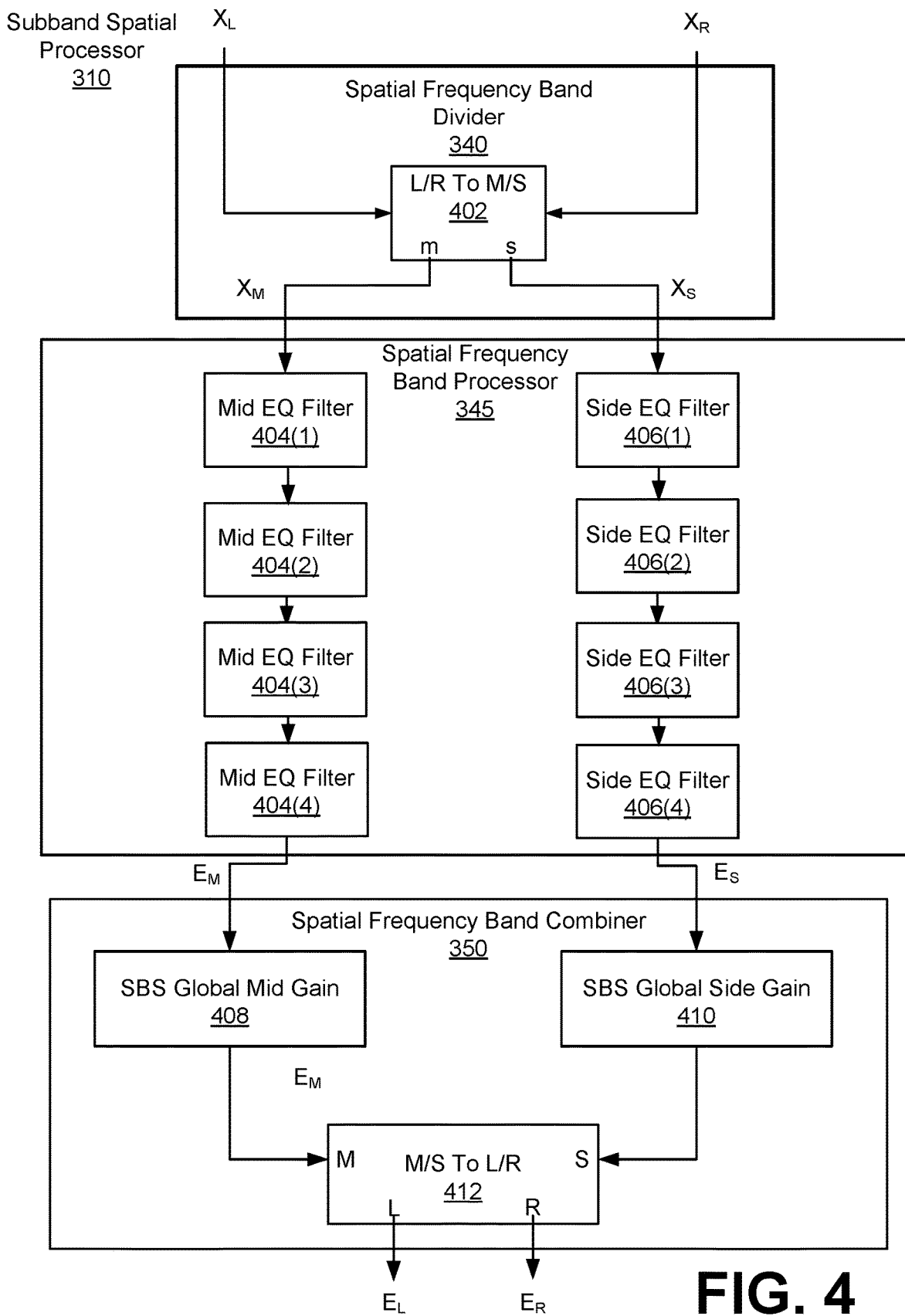
FIG. 4 is a schematic block diagram of a subband spatial processor, in accordance with some embodiments.

FIG. 4 is a schematic block diagram of the subband spatial processor 310, in accordance with some embodiments. The spatial frequency band divider 340 includes an L/R to M/S converter 402 that receives the left input channel $X_L$ and the right input channel $X_R$, and converts these inputs into the spatial component $Y_m$ and the nonspatial component $Y_s$.

The spatial frequency band processor 345 receives the nonspatial component $Y_m$ and applies a set of subband filters to generate the enhanced nonspatial subband component $E_m$. The spatial frequency band processor 345 also receives the spatial subband component $Y_s$ and applies a set of subband filters to generate the enhanced nonspatial subband component $E_m$. The subband filters can include various combinations of peak filters, notch filters, low pass filters, high pass filters, low shelf filters, high shelf filters, bandpass filters, bandstop filters, and/or all pass filters.

More specifically, the spatial frequency band processor 345 includes a subband filter for each of n frequency subbands of the nonspatial component $Y_m$ and a subband filter for each of the n subbands of the spatial component $Y_s$. For n=4 subbands, for example, the spatial frequency band processor 345 includes a series of subband filters for the nonspatial component $Y_m$ including a mid equalization (EQ) filter 404(1) for the subband (1), a mid EQ filter 404(2) for the subband (2), a mid EQ filter 404(3) for the subband (3), and a mid EQ filter 404(4) for the subband (4). Each mid EQ filter 404 applies a filter to a frequency subband portion of the nonspatial component $Y_m$ to generate the enhanced nonspatial component $E_m$.

The spatial frequency band processor 345 further includes a series of subband filters for the frequency subbands of the spatial component $Y_s$, including a side equalization (EQ) filter 406(1) for the subband (1), a side EQ filter 406(2) for the subband (2), a side EQ filter 406(3) for the subband (3), and a side EQ filter 406(4) for the subband (4). Each side EQ filter 406 applies a filter to a frequency subband portion of the spatial component $Y_s$ to generate the enhanced spatial component $E_s$.

Each of the n frequency subbands of the nonspatial component $Y_m$ and the spatial component $Y_s$ may correspond with a range of frequencies. For example, the frequency subband (1) may corresponding to 0 to 300 Hz, the frequency subband(2) may correspond to 300 to 510 Hz, the frequency subband(3) may correspond to 510 to 2700 Hz, and the frequency subband(4) may correspond to 2700 Hz to Nyquist frequency. In some embodiments, the n frequency subbands are a consolidated set of critical bands. The critical bands may be determined using a corpus of audio samples from a wide variety of musical genres. A long term average energy ratio of mid to side components over the 24 Bark scale critical bands is determined from the samples. Contiguous frequency bands with similar long term average ratios are then grouped together to form the set of critical bands. The range of the frequency subbands, as well as the number of frequency subbands, may be adjustable.

The spatial frequency band combiner 350 receives mid and side components, applies gains to each of the components, and converts the mid and side components into left and right channels. For example, the spatial frequency band combiner 350 receives the enhanced nonspatial component $E_m$ and the enhanced spatial component $E_s$, and performs global mid and side gains before converting the enhanced nonspatial component $E_m$ and the enhanced spatial component $E_s$ into the left spatially enhanced channel $E_L$ and the right spatially enhanced channel $E_R$.

More specifically, the spatial frequency band combiner 350 includes a global mid gain 408, a global side gain 410, and an M/S to L/R converter 412 coupled to the global mid gain 408 and the global side gain 410. The global mid gain 408 receives the enhanced nonspatial component $E_m$ and applies a gain, and the global side gain 410 receives the enhanced nonspatial component E and applies a gain. The M/S to L/R converter 412 receives the enhanced nonspatial component $E_m$ from the global mid gain 408 and the enhanced spatial component $E_s$ from the global side gain 410, and converts these inputs into the left spatially enhanced channel $E_L$ and the right spatially enhanced channel $E_R$.

Example Crosstalk Cancellation Processor

Figure 5:
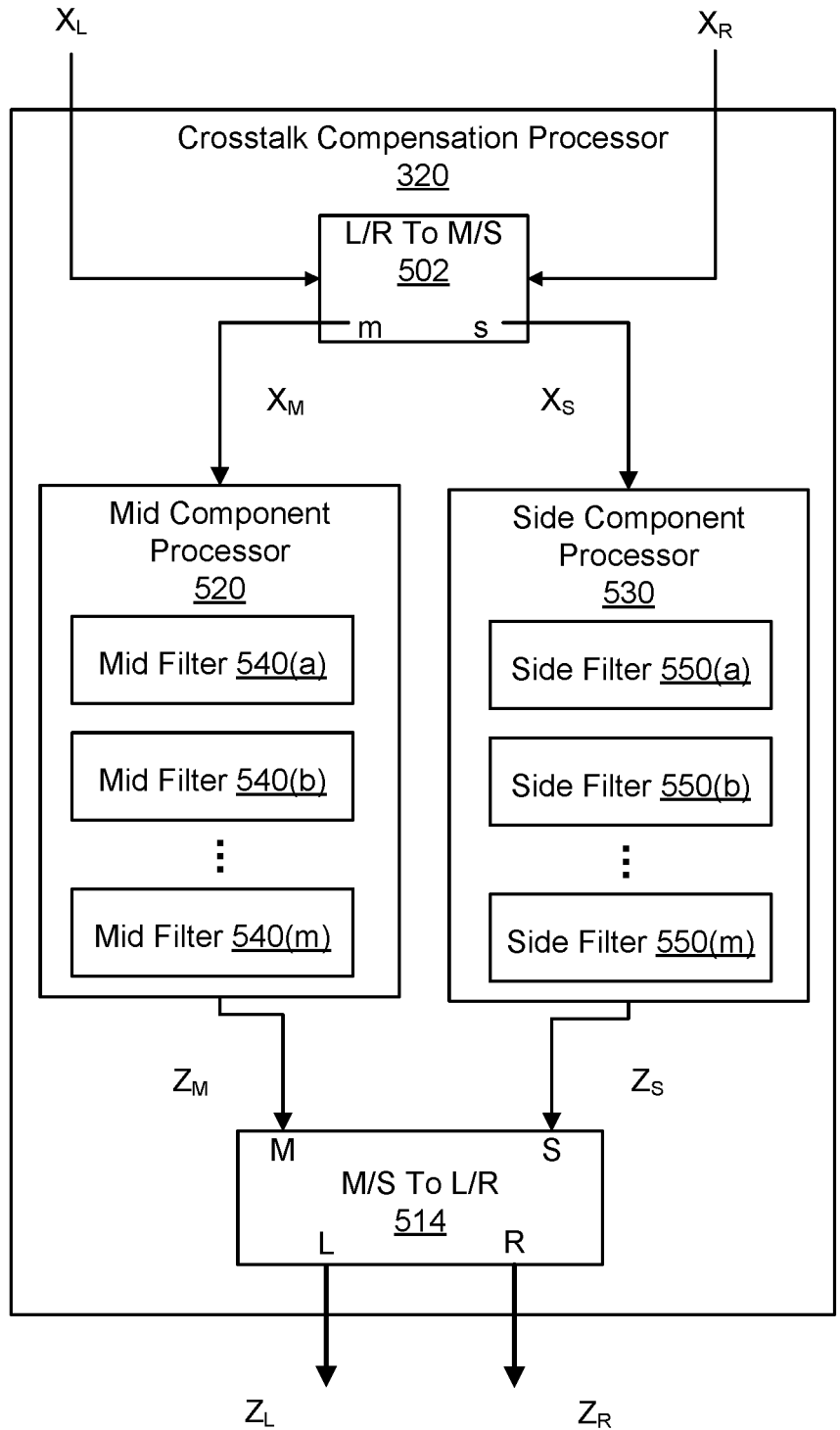
FIG. 5 is a schematic block diagram of a crosstalk compensation processor, in accordance with some embodiments.

FIG. 5 is a schematic block diagram of the crosstalk compensation processor 320, in accordance with some embodiments. The crosstalk compensation processer 320 includes an L/R to M/S converter 502, a mid component processor 520, a side component processor 530, and an M/S to L/R converter 514.

The crosstalk compensation processor 320 receives left and right input channels $X_L$, $X_R$, and performs a crosstalk compensation processing to generate the left crosstalk compensation channel $Z_L$ and the right crosstalk compensation channel $Z_R$. The channels $Z_L$, $Z_R$ may be used to compensate for artifacts or spectral defects in crosstalk processing, such as crosstalk cancellation or crosstalk simulation. The L/R to M/S converter 502 receives the left input channel $X_L$ and the right input channel $X_R$, and generates the nonspatial component $X_m$ and the spatial component $X_s$ of the input channels $X_L$, $X_R$. The left and right channels may be summed to generate the nonspatial component of the left and right channels, and subtracted to generate the spatial component of the left and right channels.

The mid component processor 520 includes a plurality of filters 540, such as m mid filters 540(a), 540(b), through 540(m). Here, each of the m mid filters 540 processes one of m frequency bands of the nonspatial component $X_m$. The mid component processor 520 generates a mid crosstalk compensation channel $Z_m$ by processing the nonspatial component $X_m$. In some embodiments, the mid filters 540 are configured using a frequency response plot of the nonspatial $X_m$ with crosstalk processing through simulation. In addition, by analyzing the frequency response plot, any spectral defects such as peaks or troughs in the frequency response plot over a predetermined threshold (e.g., 10 dB) occurring as an artifact of the crosstalk processing can be estimated. These artifacts result primarily from the summation of the delayed and possibly inverted contralateral signals with their corresponding ipsilateral signal in the crosstalk processing, thereby effectively introducing a comb filter-like frequency response to the final rendered result. The mid crosstalk compensation channel $Z_m$ can be generated by the mid component processor 520 to compensate for the estimated peaks or troughs, where each of the m frequency bands corresponds with a peak or trough. Specifically, based on the specific delay, filtering frequency, and gain applied in the crosstalk processing, peaks and troughs shift up and down in the frequency response, causing variable amplification and/or attenuation of energy in specific regions of the spectrum. Each of the mid filters 540 may be configured to adjust for one or more of the peaks and troughs.

The side component processor 530 includes a plurality of filters 550, such as m side filters 550(a), 550(b) through 550(m). The side component processor 530 generates a side crosstalk compensation channel $Z_s$ by processing the spatial component $X_s$. In some embodiments, a frequency response plot of the spatial $X_s$ with crosstalk processing can be obtained through simulation. By analyzing the frequency response plot, any spectral defects such as peaks or troughs in the frequency response plot over a predetermined threshold (e.g., 10 dB) occurring as an artifact of the crosstalk processing can be estimated. The side crosstalk compensation channel $Z_s$ can be generated by the side component processor 530 to compensate for the estimated peaks or troughs. Specifically, based on the specific delay, filtering frequency, and gain applied in the crosstalk processing, peaks and troughs shift up and down in the frequency response, causing variable amplification and/or attenuation of energy in specific regions of the spectrum. Each of the side filters 550 may be configured to adjust for one or more of the peaks and troughs. In some embodiments, the mid component processor 520 and the side component processor 530 may include a different number of filters.

In some embodiments, the mid filters 540 and side filters 550 may include a biquad filter having a transfer function defined by Equation 1:

$$H(z) = \frac{b_0 + b_1 z^{-1} + b_2 z^{-2}}{a_0 + a_1 z^{-1} + a_2 z^{-2}} \qquad \text{Eq. (1)}$$

where z is a complex variable, and $a_0$, $a_1$, $a_2$, $b_0$, $b_1$, and $b_2$ are digital filter coefficients. One way to implement such a filter is the direct form I topology as defined by Equation 2:

$$Y[n] = \frac{b_0}{a_0}X[n-1] + \frac{b_1}{a_0}X[n-1] + \frac{b_2}{a_0}X[n-2] - \frac{a_1}{a_0}Y[n-1] - \frac{a_2}{a_0}Y[n-2] \qquad \text{Eq. (2)}$$

where X is the input vector, and Y is the output. Other topologies may be used, depending on their maximum word-length and saturation behaviors.

The biquad can then be used to implement a second-order filter with real-valued inputs and outputs. To design a discrete-time filter, a continuous-time filter is designed, and then transformed into discrete time via a bilinear transform. Furthermore, resulting shifts in center frequency and bandwidth may be compensated using frequency warping.

For example, a peaking filter may have an S-plane transfer function defined by Equation 3:

$$H(s) = \frac{s^2 + s(A/Q) + 1}{s^2 + s(A/Q) + 1} \qquad \text{Eq. (3)}$$

where s is a complex variable, A is the amplitude of the peak, and Q is the filter "quality," and the digital filter coefficients are defined by:

$$b_0 = 1 + \alpha A$$

$$b_1 = -2 * \cos(\omega_0)$$

$$b_2 = 1 - \alpha A$$

$$a_0 = 1 + \frac{\alpha}{A}$$

$$\alpha_1 = -2 \cos(\omega_0)$$

$$a_2 = 1 + \frac{\alpha}{A}$$

where $\omega_0$ is the center frequency of the filter in radians and $$\alpha = \frac{\sin(\omega_0)}{2Q}.$$

Furthermore, the filter quality Q may be defined by Equation 4:

$$Q = \frac{f_c}{\Delta f} \qquad \text{Eq. (4)}$$

where $\Delta f$ is a bandwidth and $f_c$ is a center frequency.

The mid filters 540 are shown as being in a series, and the side filters 550 are shown as being in a series. In some embodiments, the mid filters 540 are applied in parallel to the mid component $X_m$, and the side filters are applied in parallel to the side component $X_s$.

The M/S to L/R converter 514 receives the mid crosstalk compensation channel $Z_m$ and the side crosstalk compensation channel $Z_s$, and generates the left crosstalk compensation channel $Z_L$ and the right crosstalk compensation channel $Z_R$. The mid and side components may be summed to generate the left channel of the mid and side components, and the mid and side components may be subtracted to generate right channel of the mid and side components.

Example Crosstalk Cancellation Processor

Figure 6:
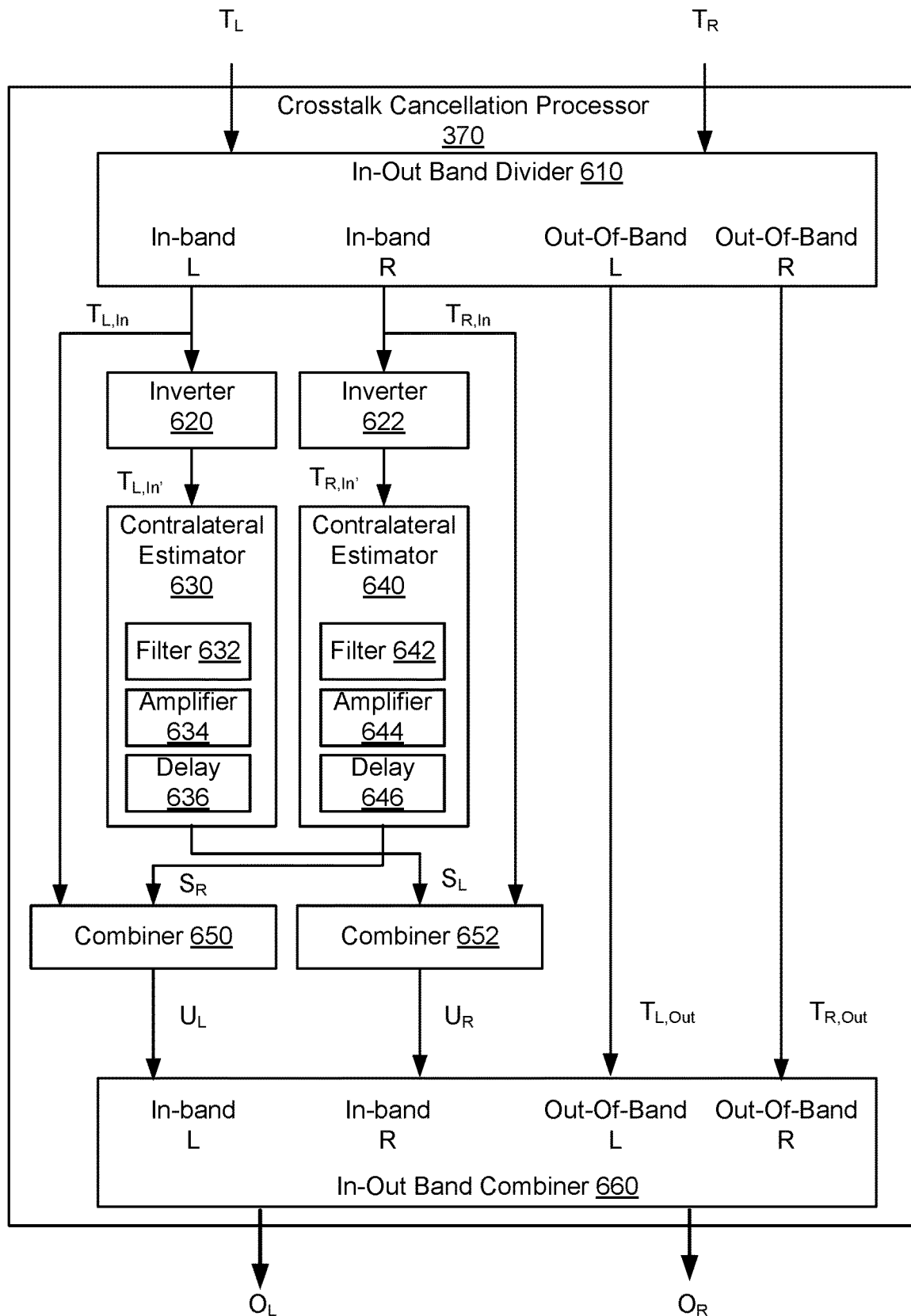
FIG. 6 is a schematic block diagram of a crosstalk cancellation processor, in accordance with some embodiments.

FIG. 6 is a schematic block diagram of a crosstalk cancellation processor 370, in accordance with some embodiments. The crosstalk cancellation processor 370 receives the left enhanced compensation channel $T_L$ and the right enhanced compensation channel $T_R$, and performs crosstalk cancellation on the channels $T_L$, $T_R$ to generate the left output channel $O_L$ and the right output channel $O_R$.

The crosstalk cancellation processor 370 includes an in-out band divider 610, inverters 620 and 622, contralateral estimators 630 and 640, combiners 650 and 652, and an in-out band combiner 660. These components operate together to divide the input channels $T_L$, $T_R$ into in-band components and out-of-band components, and perform a crosstalk cancellation on the in-band components to generate the output channels $O_L$, $O_R$.

By dividing the input audio signal T into different frequency band components and by performing crosstalk cancellation on selective components (e.g., in-band components), crosstalk cancellation can be performed for a particular frequency band while obviating degradations in other frequency bands. If crosstalk cancellation is performed without dividing the input audio signal T into different frequency bands, the audio signal after such crosstalk cancellation may exhibit significant attenuation or amplification in the nonspatial and spatial components in low frequency (e.g., below 350 Hz), higher frequency (e.g., above 12000 Hz), or both. By selectively performing crosstalk cancellation for the in-band (e.g., between 250 Hz and 14000 Hz), where the vast majority of impactful spatial cues reside, a balanced overall energy, particularly in the nonspatial component, across the spectrum in the mix can be retained.

The in-out band divider 610 separates the input channels $T_L$, $T_R$ into in-band channels $T_{L,In}$, $T_{R,In}$ and out of band channels $T_{L,Out}$, $T_{R,Out}$, respectively. Particularly, the in-out band divider 610 divides the left enhanced compensation channel $T_L$ into a left in-band channel $T_{L,In}$ and a left out-of-band channel $T_{L,Out}$. Similarly, the in-out band divider 610 separates the right enhanced compensation channel $T_R$ into a right in-band channel $T_{R,In}$ and a right out-of-band channel $T_{R,Out}$. Each in-band channel may encompass a portion of a respective input channel corresponding to a frequency range including, for example, 250 Hz to 14 kHz. The range of frequency bands may be adjustable, for example according to speaker parameters.

The inverter 620 and the contralateral estimator 630 operate together to generate a left contralateral cancellation component $S_L$ to compensate for a contralateral sound component due to the left in-band channel $T_{L,In}$. Similarly, the inverter 622 and the contralateral estimator 640 operate together to generate a right contralateral cancellation component $S_R$ to compensate for a contralateral sound component due to the right in-band channel $T_{R,In}$.

In one approach, the inverter 620 receives the in-band channel $T_{L,In}$ and inverts a polarity of the received in-band channel $T_{L,In}$ to generate an inverted in-band channel $T_{L,In}'$. The contralateral estimator 630 receives the inverted in-band channel $T_{L,In}'$, and extracts a portion of the inverted in-band channel $T_{L,In}'$ corresponding to a contralateral sound component through filtering. Because the filtering is performed on the inverted in-band channel $T_{L,In}'$, the portion extracted by the contralateral estimator 630 becomes an inverse of a portion of the in-band channel $T_{L,In}$ attributing to the contralateral sound component. Hence, the portion extracted by the contralateral estimator 630 becomes a left contralateral cancellation component $S_L$, which can be added to a counterpart in-band channel $T_{R,In}$ to reduce the contralateral sound component due to the in-band channel $T_{L,In}$. In some embodiments, the inverter 620 and the contralateral estimator 630 are implemented in a different sequence.

The inverter 622 and the contralateral estimator 640 perform similar operations with respect to the in-band channel $T_{R,In}$ to generate the right contralateral cancellation component $S_R$. Therefore, detailed description thereof is omitted herein for the sake of brevity.

In one example implementation, the contralateral estimator 630 includes a filter 632, an amplifier 634, and a delay unit 636. The filter 632 receives the inverted input channel $T_{L,In}'$ and extracts a portion of the inverted in-band channel $T_{L,In}'$ corresponding to a contralateral sound component through a filtering function. An example filter implementation is a Notch or Highshelf filter with a center frequency selected between 5000 and 10000 Hz, and Q selected between 0.5 and 1.0. Gain in decibels ($G_{gB}$) may be derived from Equation 5:

$$G_{gB} = -3.0 - \log_{1.333}(D) \qquad \text{Eq. (5)}$$

where D is a delay amount by delay unit 636 and 646 in samples, for example, at a sampling rate of 48 KHz. An alternate implementation is a Lowpass filter with a corner frequency selected between 5000 and 10000 Hz, and Q selected between 0.5 and 1.0. Moreover, the amplifier 634 amplifies the extracted portion by a corresponding gain coefficient $G_{L,In}$, and the delay unit 636 delays the amplified output from the amplifier 634 according to a delay function D to generate the left contralateral cancellation component $S_L$. The contralateral estimator 640 includes a filter 642, an amplifier 644, and a delay unit 646 that performs similar operations on the inverted in-band channel $T_{R,In}'$ to generate the right contralateral cancellation component $S_R$. In one example, the contralateral estimators 630, 640 generate the left and right contralateral cancellation components $S_L$, $S_R$, according to equations below:

$$S_L = D[G_{L,In} * F[T_{L,In}']] \qquad \text{Eq. (6)}$$

$$S_R = D[G_{R,In} * F[T_{R,In}']] \qquad \text{Eq. (7)}$$

where F[ ] is a filter function, and D[ ] is the delay function.

The configurations of the crosstalk cancellation can be determined by the speaker parameters. In one example, filter center frequency, delay amount, amplifier gain, and filter gain can be determined, according to an angle formed between two speakers 280 with respect to a listener. In some embodiments, values between the speaker angles are used to interpolate other values.

The combiner 650 combines the right contralateral cancellation component $S_R$ to the left in-band channel $T_{L,In}$ to generate a left in-band crosstalk channel $U_L$, and the combiner 652 combines the left contralateral cancellation component $S_L$ to the right in-band channel $T_{R,In}$ to generate a right in-band crosstalk channel $U_R$. The in-out band combiner 660 combines the left in-band crosstalk channel $U_L$ with the out-of-band channel $T_{L,Out}$ to generate the left output channel $O_L$, and combines the right in-band crosstalk channel $U_R$ with the out-of-band channel $T_{R,Out}$ to generate the right output channel $O_R$.

Accordingly, the left output channel $O_L$ includes the right contralateral cancellation component $S_R$ corresponding to an inverse of a portion of the in-band channel $T_{R,In}$ attributing to the contralateral sound, and the right output channel $O_R$ includes the left contralateral cancellation component $S_L$ corresponding to an inverse of a portion of the in-band channel $T_{L,In}$ attributing to the contralateral sound. In this configuration, a wavefront of an ipsilateral sound component output by a right loudspeaker according to the right output channel $O_R$ arrived at the right ear can cancel a wavefront of a contralateral sound component output by a left loudspeaker according to the left output channel $O_L$. Similarly, a wavefront of an ipsilateral sound component output by the left loudspeaker according to the left output channel $O_L$ arrived at the left ear can cancel a wavefront of a contralateral sound component output by the right loudspeaker according to right output channel $O_R$. Thus, contralateral sound components can be reduced to enhance spatial detectability.

Example Spatial Enhancement Processor

Figure 7:
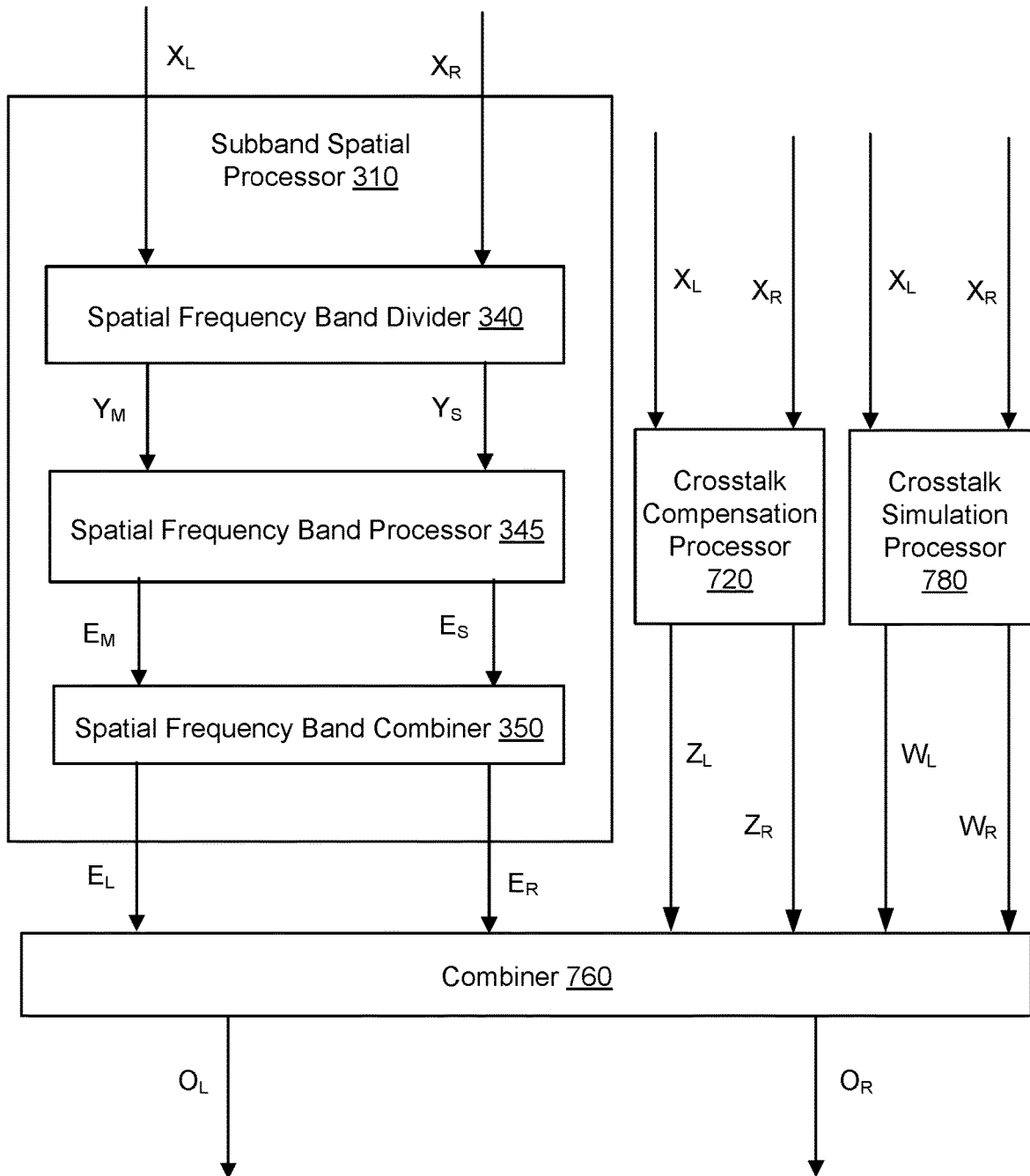
FIG. 7 is a schematic block diagram of a spatial enhancement processor with crosstalk simulation, in accordance with some embodiments.

FIG. 7 is a schematic block diagram of a spatial enhancement processor 700, in accordance with some embodiments. The spatial enhancement processor 700 is an example of a spatial enhancement processor 120 where the crosstalk processing is a crosstalk simulation for a client device 130 using headphones. The spatial enhancement processor 700 performs crosstalk simulation for the input audio signal X to generate an output audio signal O including a left output channel $O_L$ for a left headphone and a right output channel $O_R$ for a right headphone. The left input channel $X_L$ may be the left output channel 142 from the spatial mixing processor 110, and the right input channel $X_R$ may be the right output channel 144 from the spatial mixing processor 110. The left enhanced channel $O_L$ corresponds with the left enhanced channel 146 and the right enhanced channel $O_R$ corresponds with the right enhanced channel 148.

The spatial enhancement processor 700 includes the subband spatial processor 310, a crosstalk compensation processor 720, a crosstalk simulation processor 780, and a combiner 760. The crosstalk compensation processor 720 receives the input channels $X_L$ and $X_R$, and performs a processing to compensate for artifacts in a subsequent combination of a crosstalk simulation signal W, including left crosstalk simulation signal $W_L$ and right crosstalk simulation signal $W_R$, generated by the crosstalk simulation processor 780 and the enhanced signal E, including the left enhanced channel $E_L$ and the right enhanced channel $E_R$, generated by the subband spatial processor 310. The crosstalk compensation processor 720 generates a crosstalk compensation signal Z, including a left crosstalk compensation channel $Z_L$ and a right crosstalk compensation channel $Z_R$. The crosstalk simulation processor 780 generates the left crosstalk simulation channel $W_L$ and the right crosstalk simulation channel $W_R$. The subband spatial processor 310 generates the left enhanced channel $E_L$ and the right enhanced channel $E_R$. Additional details regarding the crosstalk simulation processor 780 are discussed below in connection with FIG. 8.

The combiner 760 receives the left enhanced channel $E_L$, the right enhanced channel $E_R$, the left crosstalk simulation channel $W_L$, the right crosstalk simulation channel $W_R$, the left crosstalk compensation channel $Z_L$, and the right crosstalk compensation channel $Z_R$. The combiner 760 generates the left output channel $O_L$ by combining the left enhanced channel $E_L$, the right crosstalk simulation channel $W_R$, and the left crosstalk compensation channel $Z_L$. The combiner 760 generates the right output channel $O_R$ by combining the left enhanced channel $E_L$, the right crosstalk simulation channel $W_R$, and the left crosstalk compensation channel $Z_L$.

Example Crosstalk Simulation Processor

Figure 8:
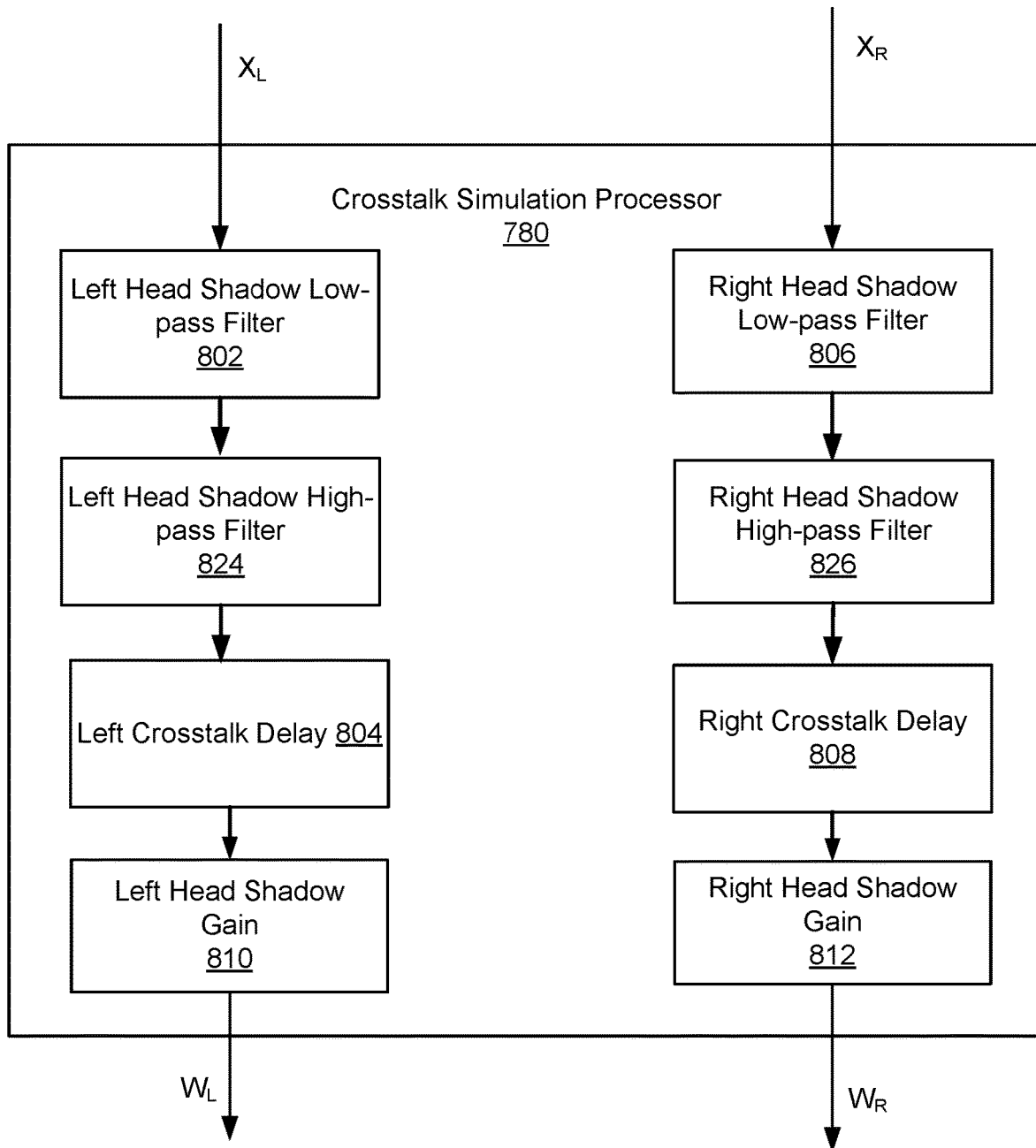
FIG. 8 is a schematic block diagram of a crosstalk simulation processor, in accordance with some embodiments.

FIG. 8 is a schematic block diagram of the crosstalk simulation processor 780, in accordance with some embodiments. The crosstalk simulation processor 780 generates contralateral sound components for output to the stereo headphones, thereby providing a loudspeaker-like listening experience on headphones. The left input channel $X_L$ may be the left output channel 142 from the spatial mixing processor 110, and the right input channel $X_R$ may be the right output channel 144 from the spatial mixing processor 110.

The crosstalk simulation processor 780 includes a left head shadow low-pass filter 802, a left head shadow high-pass filter 824, a left cross-talk delay 804, and a left head shadow gain 810 to process the left input channel $X_L$. The crosstalk simulation processor 780 further includes a right head shadow low-pass filter 806, a right head shadow high-pass filter 826, a right cross-talk delay 808, and a right head shadow gain 812 to process the right input channel $X_R$. The left head shadow low-pass filter 802 and left head shadow high-pass filter 824 apply modulation on the left input channel $X_L$ that models the frequency response of the signal after passing through the listener's head. The output of the left head shadow high-pass filter 824 is provided to the left crosstalk delay 804, which applies a time delay. The time delay represents transaural distance that is traversed by a contralateral sound component relative to an ipsilateral sound component. The left head shadow gain 810 applies a gain to the output of the left crosstalk delay 804 to generate the right left simulation channel $W_L$.

Similarly for the right input channel $X_R$, the right head shadow low-pass filter 806 and right head shadow high-pass filter 826 apply modulation to the right input channel $X_R$ that models the frequency response of the listener's head. The output of the right head shadow high-pass filter 826 is provided to the right crosstalk delay 808, which applies a time delay. The right head shadow gain 812 applies a gain to the output of the right crosstalk delay 808 to generate the right crosstalk simulation channel $W_R$.

The application of the head shadow low-pass filter, head shadow high-pass filter, crosstalk delay, and head shadow gain for each of the left and right channels may be performed in different orders.

Example Conference Processing

Figure 9:
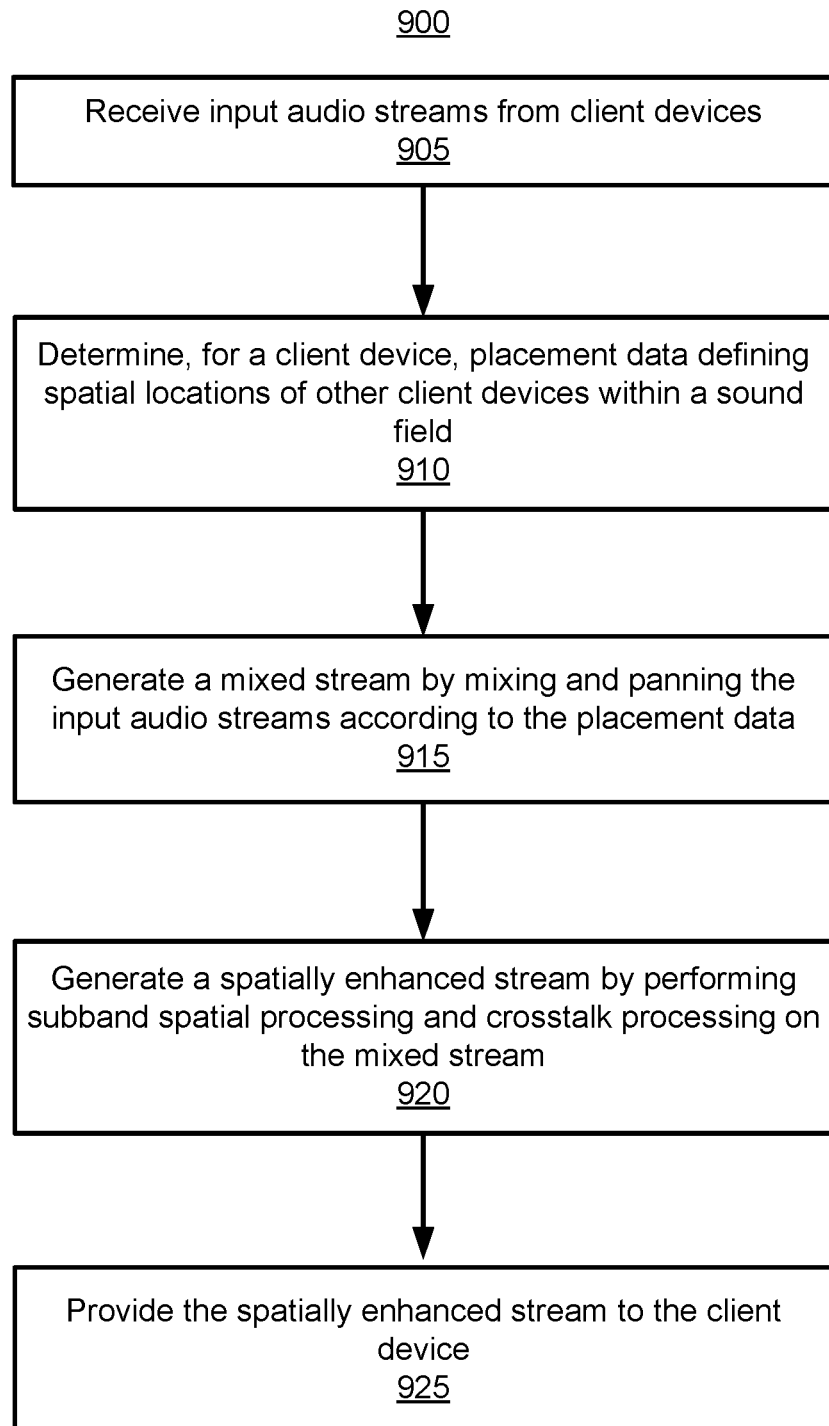
FIG. 9 is a flowchart of a process for conferencing between client devices, in accordance with some embodiments.

FIG. 9 is a flowchart of a process 900 for conferencing between client devices, in accordance with some embodiments. The process 900 is performed to provide a spatially enhanced stereophonic audio stream to a client device 130 that includes input audio streams from other client devices 130 in conference with the client device 130. The process 900 may include fewer or additional steps, and steps may be performed in different orders. The process 900 is discussed with reference to FIGS. 10 and 11, each including a diagram of the audio processing system 100, in accordance with some embodiments.

A server 102 (e.g., having spatial mixing processor 110) receives 905 input audio streams from multiple client devices 130. In one example, the audio streams may include monophonic audio streams. In another example, one or more input audio streams may include multiple audio channels (e.g., stereo, 5.1 channel surround sound, $1^{st}$ order ambisonics, etc.). The input audio streams may be transmitted from the multiple client devices 130 via a network. In some embodiments, each client device 130 transmits metadata in connection with an input audio stream. The metadata may include device identification data that identifies the client device, placement data that defines the desired spatial locations of other audio streams of other client devices.

The server 102 (e.g., having spatial mixing processor 110) determines 910, for a client device 130, placement data defining spatial locations of other client devices 130 within a sound field. The placement data may be defined in various ways. For example, the placement data may be received from the client device as metadata, or may be predefined by the server 102. In some embodiments, client devices 130 are automatically panned in the absence of user pan control. Users may optionally pan voices per their preference.

The server 102 (e.g., having spatial mixing processor 110) generates 915 a mixed stream by mixing and panning the input audio streams according to the placement data. The mixed stream may be a stereo audio signal including a left mixed channel and a right mixed channel. For example, the spatial mixing processor 110 may determine a spatial position for an audio stream 140 within a sound field, and generate a left channel and a right channel from the audio stream 140 according to the spatial position associated with the audio stream 140. Left and right channels are generated for each audio stream 140 of other client devices 130. The left channels of multiple audio streams 140 are combined into the left mixed channel 142, and the right channels of multiple audio streams 140 are combined into the right mixed channel 144.

Figure 10:
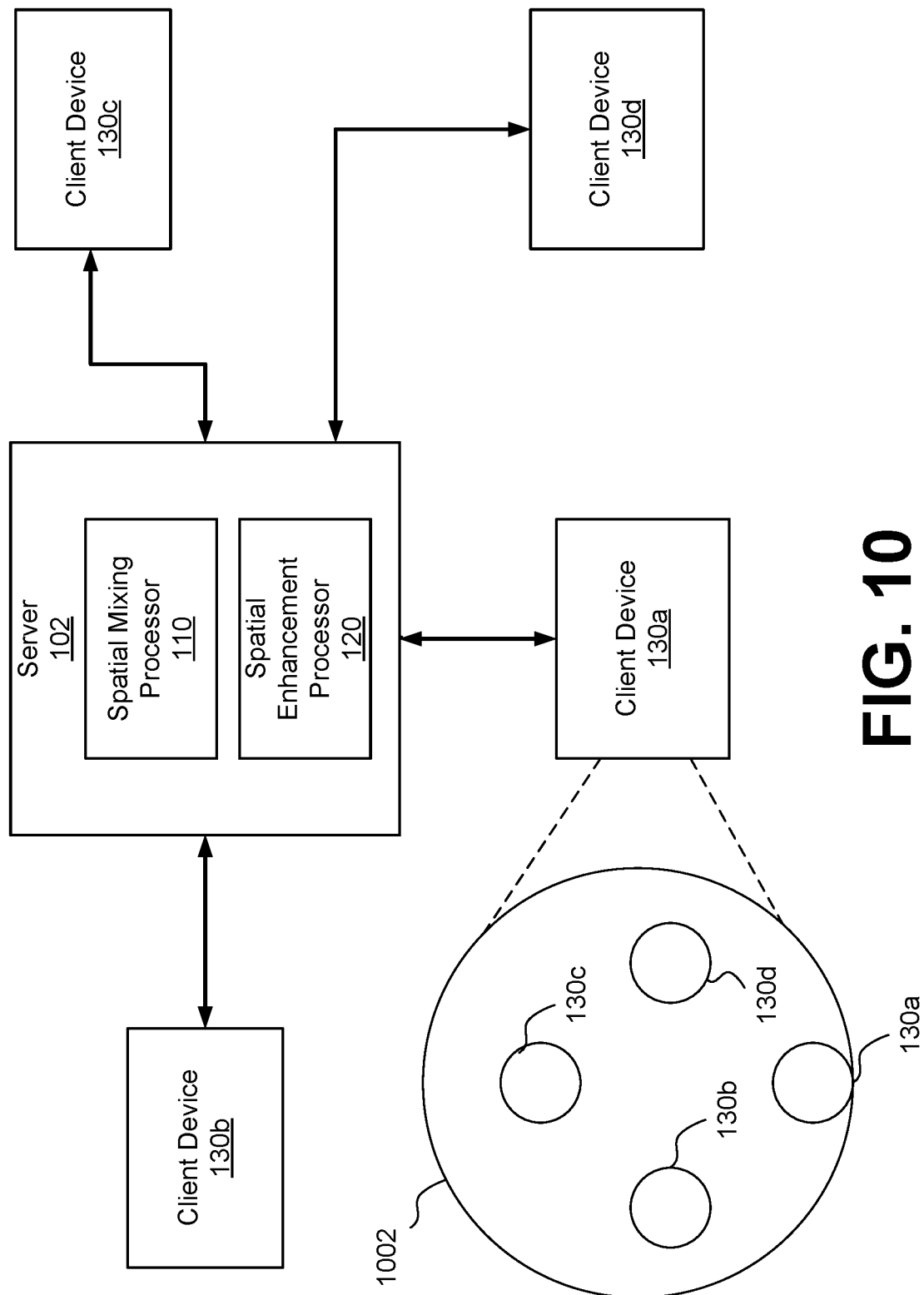
FIG. 10 is a diagram of an audio processing system, in accordance with some embodiments.

With reference to FIG. 10, multiple client devices 130a, 130b, 130c, and 140d are in a conference and connected to the server 110. For the client device 130a, a sound field 1002 is shown defined around the client device 130a. Other client devices 130b, 130c, and 130d are positioned in the sound field 1002 according to the placement data. Although a uniform spatial distribution of spaced apart client devices 130 is shown in the sound field 1002, the spatial distribution is not necessarily uniform. For example, client devices 130 may be distributed within the sound field 1002 based on placement data defining a user role, entity/company name, group membership, room location, geographic location, IP address, etc.

The server 102 (e.g., having spatial enhancement processor 120) generates 920 a spatially enhanced stream by applying subband spatial processing and crosstalk processing on the mixed stream. The spatially enhanced stream may be a stereo audio signal including a left enhanced channel and a right enhanced channel. The spatial enhancement processor 120 may perform various types of spatial enhancement. For subband spatial processing, the spatial enhancement processor 120 generates a left channel and right channel by gain adjusting mid and side subband components of the left mixed channel and the right mixed channel of the mixed stream. The crosstalk processing may include crosstalk cancellation or crosstalk simulation, such as depending on whether the client device 130 is using loudspeakers or headphones. In some embodiments, different types of spatial enhancement may be performed for different client devices 130.

In some embodiments, the spatial enhancement processing applied to the mixed stream for a client device 130 may be based on device information from the client device 130. The device information may include parameters for the components of the spatial enhancement processor 120 such as speaker parameters (e.g., size, frequency response, location, orientation, etc.) or operating parameters of the spatial enhancement processor such as filter values, gain values, time delay values, intensity of spatial enhancement effect, etc. In some embodiments, the operating parameters for the spatial enhancement processor 120 are derived from the speaker parameters. Different types of spatial enhancement processing may be used for different types of client devices 130. For example, client devices 130 may vary based on the type of speakers (e.g., loudspeaker or headphones) and parameters of the speakers (e.g., frequency response, relative size, relative orientation etc.).

In some embodiments, the server 102 receives a device description from each of the client devices, and determines the parameters of the spatial enhancement processor 120 based on the device description. The device description may identify a type of client device, such as laptop, soundbar, headphones, loudspeakers, desktop speakers, etc. Different types of client devices may be associated with different parameters, and the parameters are selected based on the device type.

The server 102 provides 925 the spatially enhanced stream to the client device 130. For example, the server 102 sends the spatially enhanced stream including the left enhanced channel and right enhanced channel to the client device 130 via a network. The left enhanced channel is provided to a left speaker 152 and the right enhanced channel is provided to a right speaker 154 to reproduce sound according to the spatially enhanced stream.

In some embodiments, the server 102 (e.g., spatial mixing processor 110) provides panning metadata to each client device 130 in connection with the spatially enhanced stream (or mixed stream). The panning metadata may include information that identifies participants in the audio stream. Participants may be identified by user role, entity/company name, group membership, room location, geographic location, IP address.

Figure 11:
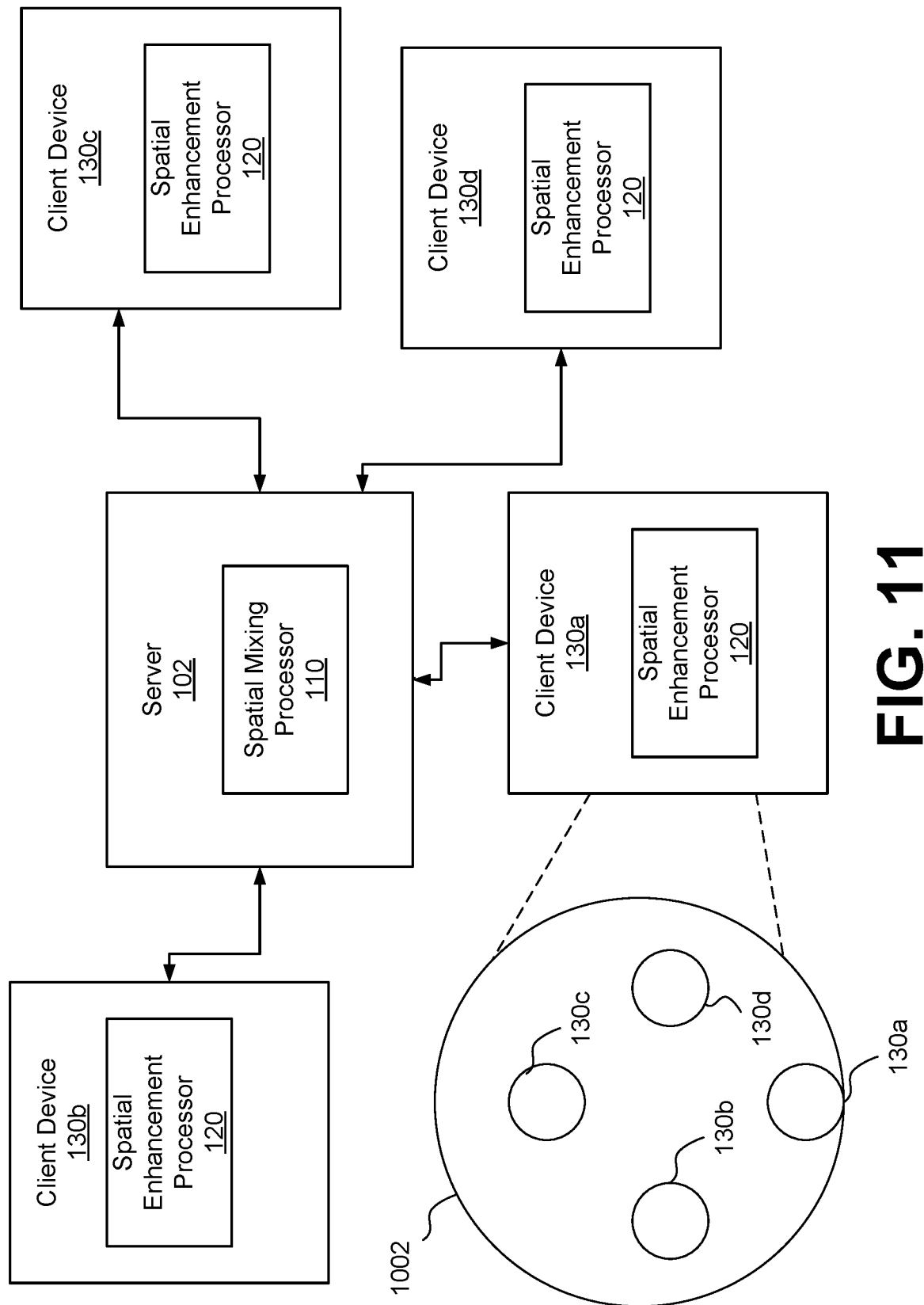
FIG. 11 is a diagram of an audio processing system, in accordance with some embodiments.

In some embodiments, the server 102 provides the mixed stream to the client device 130 for spatial enhancement processing by each client device 130. The client device 130 includes the spatial enhancement processor 120 that generates the left and right enhanced channels using the mixed stream. With reference to FIG. 11, each client device 130a through 130d includes a spatial enhancement processor 120 that processes a mixed stream from the spatial mixing processor 110. The parameters for the components of the spatial enhancement processor 120 as used by the spatial enhancement processor 120 at the client device 120, and there is no need to transmit the parameters or device information to the server 102. As discussed above, different types of spatial enhancement processing may be used for different types of client devices 130 and speaker configurations.

Figure 12:
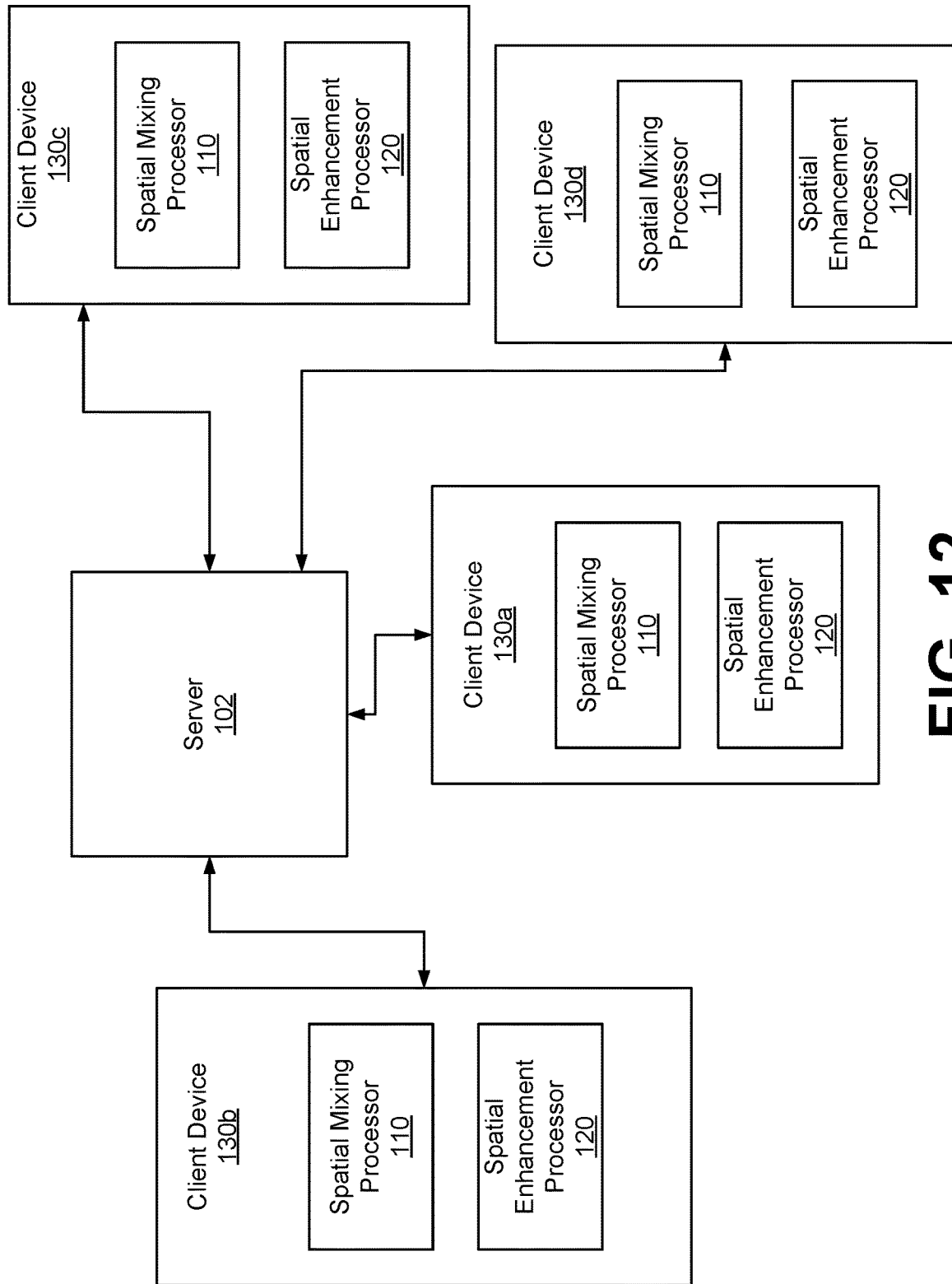
FIG. 12 is a diagram of an audio processing system, in accordance with some embodiments.

In some embodiments, the server 102 provides un-mixed streams of audio signals 140 to the client device 130, which then handles the stereo mixdown followed by spatial enhancement. With reference to FIG. 12, each client device 130a through 130d includes a spatial mixing processor 110 that performs the mixdown to generate a mixed stream, and a spatial enhancement processor 120 that processes a mixed stream from the spatial mixing processor 110. The server 102 provides an intermediary for connecting the client devices 130a through 130d, and for providing the input signals 140 to each client device 130 from other client devices 130. In some embodiments, such as in a peer-to-peer configuration, each client device 130 is connected to each other without the server 102. Here, each of the client devices 130 provides an audio signal 140 to the other client devices 130.

Steps 910-925 may be performed in parallel for each client device 130 participating in the conference. A different mixed stream may be generated for each client device 130 from the input audio streams of one or more other client devices 130. The server 102 may include multiple instances of the spatial enhancement processor 120 for each of the client devices 130, each handling a different mixed stream. Furthermore, the steps 910-925 may be repeated to provide audio stream inputs and outputs to each client device 130 participating in the conference.

Example Computer

Figure 13:
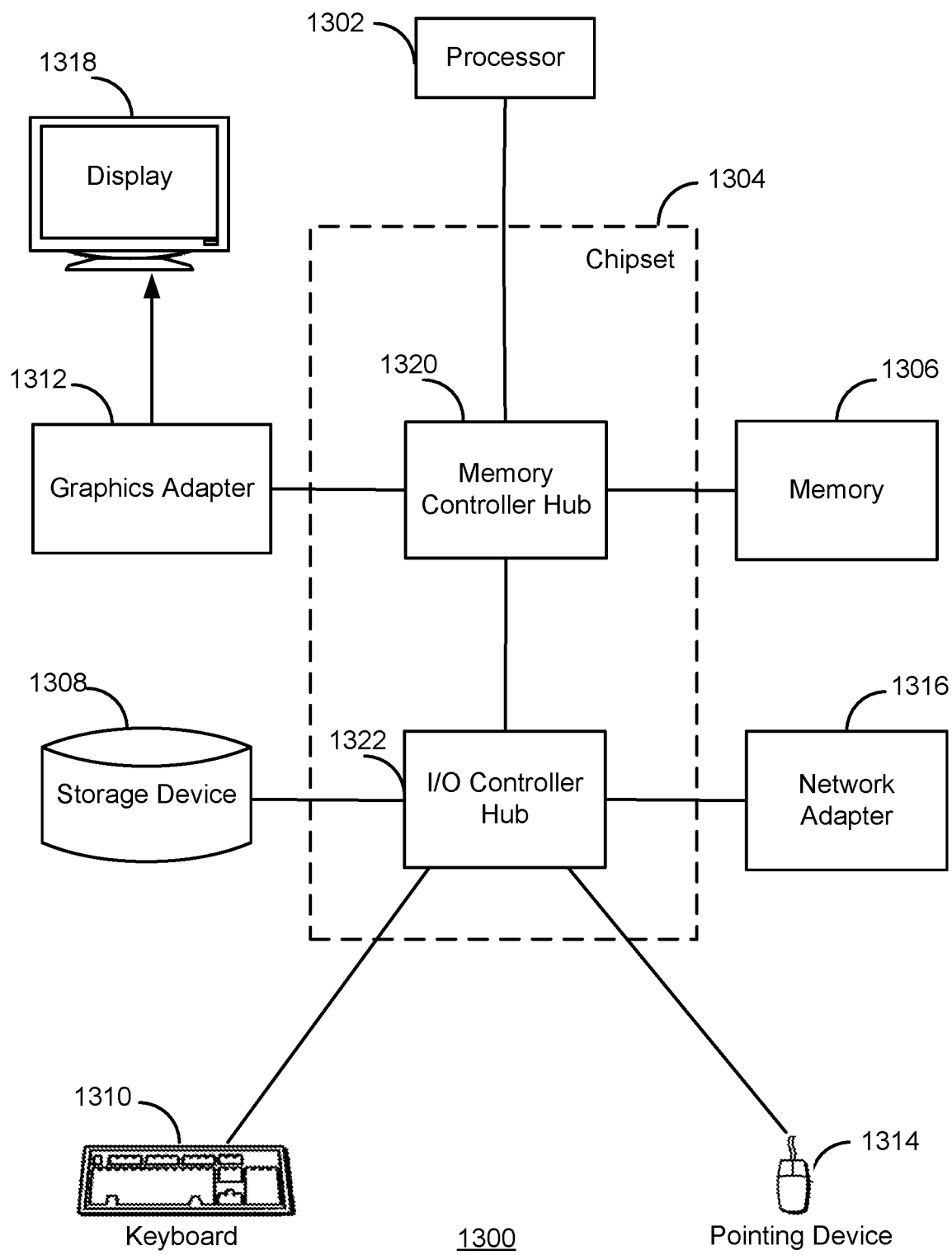
FIG. 13 is a schematic block diagram of a computer system, in accordance with some embodiments.

FIG. 13 is a schematic block diagram of a computer 1300, according to one embodiment. The computer 1300 is an example of circuitry that implements an audio system. Illustrated are at least one processor 1302 coupled to a chipset 1304. The chipset 1304 includes a memory controller hub 1320 and an input/output (I/O) controller hub 1322. A memory 1306 and a graphics adapter 1312 are coupled to the memory controller hub 1320, and a display device 1318 is coupled to the graphics adapter 1312. A storage device 1308, keyboard 1310, pointing device 1314, and network adapter 1316 are coupled to the I/O controller hub 1322. The computer 1300 may include various types of input or output devices. Other embodiments of the computer 1300 have different architectures. For example, the memory 1306 is directly coupled to the processor 1302 in some embodiments.

The storage device 1308 includes one or more non-transitory computer-readable storage media such as a hard drive, compact disk read-only memory (CD-ROM), DVD, or a solid-state memory device. The memory 1306 holds program code (comprised of one or more instructions) and data used by the processor 1302. The program code may correspond to the processing aspects described with FIGS. 1-11.

The pointing device 1314 is used in combination with the keyboard 1310 to input data into the computer system 1300. The graphics adapter 1312 displays images and other information on the display device 1318. In some embodiments, the display device 1318 includes a touch screen capability for receiving user input and selections. The network adapter 1316 couples the computer system 1300 to a network. Some embodiments of the computer 1300 have different and/or other components than those shown in FIG. 13.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method for providing a conference for a client device of a plurality of client devices, comprising:
   receiving input audio streams from the plurality of client devices;
   generating a mixed stream for the client device including a left mixed channel and a right mixed channel by mixing and panning input audio streams of other client devices of the plurality of client devices according to placement data defining spatial locations for the other client devices within a sound field;
   determining a type of speaker associated with the client device;
   generating a crosstalk processed stream including a left channel and a right channel by applying crosstalk processing on the left mixed channel and the right mixed channel of the mixed stream, wherein:
      the crosstalk processing is a crosstalk simulation responsive to determining a first type of speaker is associated with the client device; and
      the crosstalk processing is a crosstalk cancellation responsive to determining a second type of speaker is associated with the client device; and
   providing the left channel of the crosstalk processed stream to a left speaker of the client device and the right channel of the crosstalk processed stream to a right speaker of the client device.

2. The method of claim 1, wherein the crosstalk processing comprises:
   generating a left crosstalk processed component by separating the left mixed channel into a left mixed in-band signal and a left mixed out-of-band signal, wherein at least a portion of the left mixed channel includes the left mixed in-band signal; and
   generating a right crosstalk processed component by separating the right mixed channel into a right mixed in-band signal and a right mixed out-of-band signal, wherein at least a portion of the right mixed channel includes the right mixed in-band signal.

3. The method of claim 1, further comprising applying a crosstalk compensation to the mixed stream that adjusts for spectral defects caused by applying the crosstalk processing to the mixed stream.

4. The method of claim 1, further comprising determining the placement data by receiving the placement data from the client device via a network.

5. The method of claim 1, wherein each of the input audio streams from the client devices includes a plurality of audio channels.

6. The method of claim 1, wherein generating the mixed stream for the client device including the left mixed channel and the right mixed channel by mixing and panning the input audio streams of the other client devices according to the placement data includes:
generating a left channel and a right channel from each of the input audio streams of the other client devices according to the spatial locations of the other client devices within the sound field;
combining left channels from the input audio streams of the other client devices to generate the left mixed channel; and
combining the right channels from the input audio streams of the other client devices to generate the right mixed channel.

7. The method of claim 1, wherein:
a server connected to the plurality of client devices generates the mixed stream and provides the mixed stream to the client device; and
the client device generates the crosstalk processed stream from the mixed stream.

8. The method of claim 1, wherein a server connected to the plurality of client devices generates the mixed stream and the crosstalk processed stream, and provides the crosstalk processed stream to the client device.

9. The method of claim 8, wherein the server receives a device description from the client device and determines parameters for applying the crosstalk processing based on the device description.

10. The method of claim 1, wherein the client device generates the mixed stream and the crosstalk processed stream.

11. The method of claim 1, further comprising:
generating a spatially enhanced stream including a left enhanced channel and a right enhanced channel by applying subband spatial processing on the left mixed channel and the right mixed channel of the mixed stream, wherein the subband spatial processing comprises:
applying first gains to mid subband components of a mid component of the left mixed channel and the right mixed channel to generate an enhanced mid component;
applying second gains to side subband components of a side component of the left mixed channel and the right mixed channel to generate an enhanced side component; and
generating the left enhanced channel and the right enhanced channel using the enhanced mid component and the enhanced side component; and
providing the left enhanced channel of the spatially enhanced stream to a left speaker of the client device and the right enhanced channel of the spatially enhanced stream to a right speaker of the client device.

12. A non-transitory computer readable medium storing program code that when executed by a processor configures the processor to:
receive input audio streams from a plurality of client devices;
generate a mixed stream for the client device including a left mixed channel and a right mixed channel by mixing and panning input audio streams of other client devices of the plurality of client devices according to the placement data defining spatial locations for the other client devices within a sound field; and
determine a type of speaker associated with the client device; and
generate a crosstalk processed stream including a left channel and a right channel by applying crosstalk processing on the left mixed channel and the right mixed channel of the mixed stream, wherein:
the crosstalk processing is a crosstalk simulation responsive to determining a first type of speaker is associated with the client device; and
the crosstalk processing is a crosstalk cancellation responsive to determining a second type of speaker is associated with the client device.

13. The computer readable medium of claim 12, wherein the program code that configures the processor to generate the crosstalk processed stream includes program code that further configures the processor to apply subband spatial processing on the left mixed channel and the right mixed channel of the mixed stream.

14. The computer readable medium of claim 12, further comprising program code that when executed further configures the processor to receive a device description from the client device, and determine parameters for applying the crosstalk processing based on the device description.

15. The computer readable medium of claim 12, further comprising program code that when executed further configures the processor to apply crosstalk compensation to the mixed stream that adjusts for spectral defects caused by applying the crosstalk processing to the mixed stream.

16. The computer readable medium of claim 12, further comprising program code that when executed further configures the processor to:
generate a left crosstalk processed component by:
separating the left mixed channel into a left mixed in-band signal and a left mixed out-of-band signal, wherein at least a portion of the left mixed channel includes the left mixed in-band signal; and
generate a right crosstalk processed component by:
separating the right mixed channel into a right mixed in-band signal and a right mixed out-of-band signal, wherein at least a portion of the right mixed channel includes the right mixed in-band signal.

17. The computer readable medium of claim 12, further comprising program code that when executed configures the processor to provide the mixed stream including the left mixed channel and the right mixed channel to the client device.

18. A system for providing a conference for a client device of a plurality of client devices, comprising:
processing circuitry configured to:
receive input audio streams from the plurality of client devices;
generate a mixed stream for the client device of the plurality of client devices including a left mixed channel and a right mixed channel by mixing and panning input audio streams of other client devices of the plurality of client devices of the plurality of client devices according to the placement data defining spatial locations for the other client devices within a sound field; and determine a type of speaker associated with the client device; and generate a crosstalk processed stream including a left channel and a right channel by applying crosstalk processing on the left mixed channel and the right mixed channel of the mixed stream, wherein:

the crosstalk processing is a crosstalk simulation responsive to determining a first type of speaker is associated with the client device; and the crosstalk processing is a crosstalk cancellation responsive to determining a second type of speaker is associated with the client device.

19. The system of claim 18, wherein the processing circuitry is further configured to:

receive a device description from the client device; and determine parameters for applying the crosstalk processing based on the device description.

20. The system of claim 18, wherein the processing circuitry is further configured to apply crosstalk compensation to the mixed stream that adjusts for spectral defects caused by applying the crosstalk processing to the mixed stream.

* * * * *